(12) United States Patent
Takahashi et al.

(10) Patent No.: US 11,227,196 B2
(45) Date of Patent: Jan. 18, 2022

(54) IMAGE COLLATING DEVICE

(71) Applicant: NEC CORPORATION, Tokyo (JP)

(72) Inventors: Toru Takahashi, Tokyo (JP); Rui Ishiyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 28 days.

(21) Appl. No.: 16/955,606

(22) PCT Filed: Nov. 15, 2018

(86) PCT No.: PCT/JP2018/042334
§ 371 (c)(1),
(2) Date: Jun. 18, 2020

(87) PCT Pub. No.: WO2019/123917
PCT Pub. Date: Jun. 27, 2019

(65) Prior Publication Data
US 2021/0012167 A1 Jan. 14, 2021

(30) Foreign Application Priority Data

Dec. 22, 2017 (JP) .............................. JP2017-245795

(51) Int. Cl.
*G06K 9/68* (2006.01)
*G06K 9/52* (2006.01)

(52) U.S. Cl.
CPC .......... *G06K 9/6885* (2013.01); *G06K 9/522* (2013.01)

(58) Field of Classification Search
CPC .................... G06K 9/6885; G06K 9/522
See application file for complete search history.

(56) References Cited

U.S. PATENT DOCUMENTS

2009/0274997 A1   11/2009   Kosuge et al.

FOREIGN PATENT DOCUMENTS

| JP | 9-022406 A | 1/1997 |
| JP | 10-134185 A | 5/1998 |
| JP | H10-320552 A | 12/1998 |

(Continued)

OTHER PUBLICATIONS

Elboher et al, "Asymmetric Correlation: A Noise Robust Similarity Measure for Template Matching", 2013, IEEE Transactions on Image Processing, vol. 22, No. 8, pp. 3062-3073 (12 pages) (Year: 2013).*

(Continued)

*Primary Examiner* — David F Dunphy
(74) *Attorney, Agent, or Firm* — Sughrue Mion, PLLC

(57) ABSTRACT

An image collating device that collates a first image and a second image includes a frequency characteristic acquiring unit, a frequency characteristic synthesizing unit, and a determining unit. The frequency characteristic acquiring unit acquires a frequency characteristic of the first image and a frequency characteristic of the second image. The frequency characteristic synthesizing unit generates a synthesized frequency characteristic by synthesizing the frequency characteristic of the first image and the frequency characteristic of the second image. The determining unit calculates a score indicating a degree to which the synthesized frequency characteristic is a wave having a single period, and collates the first image and the second image based on the score.

20 Claims, 24 Drawing Sheets

(56) References Cited

FOREIGN PATENT DOCUMENTS

| JP | 3254622 B2 | 2/2002 |
| JP | 2007-078511 A | 3/2007 |
| JP | 2008-015848 A | 1/2008 |
| JP | 5558127 B2 | 7/2014 |

OTHER PUBLICATIONS

European Search Report for EP Application No. EP18891876.7 dated Feb. 8, 2021.
Reiko Iwai et al: "New method for increasing matching accuracy and reducing process time of fingerprint data by the fractional Fourier transform", 2010 17th IEEE International Conference on Image Processing (ICIP 2010); Sep. 26-29, 2010; Hong Kong, China, IEEE, Piscataway, NJ, USA, Sep. 26, 2010, pp. 3061-3064, XP031815301.
International Search Report for PCT/JP2018/042334 dated Feb. 12, 2019 (PCT/ISA/210).
Japanese Office Action for JP Application No. 2019-560880 dated Jan. 27, 2021 with English Translation.

\* cited by examiner

FIG. 5

$$F(k_1, k_2) = \sum_{n_1, n_2} f(n_1, n_2) W_{N_1}^{k_1 n_1} W_{N_2}^{k_2 n_2}$$

$$= A_F(k_1, k_2) e^{j\theta_F(k_1, k_2)} \quad \cdots (1)$$

$$G(k_1, k_2) = \sum_{n_1, n_2} g(n_1, n_2) W_{N_1}^{k_1 n_1} W_{N_2}^{k_2 n_2}$$

$$= A_G(k_1, k_2) e^{j\theta_G(k_1, k_2)} \quad \cdots (2)$$

$$W_{N_1} = e^{-j\frac{2\pi}{N_1}} \quad \cdots (3)$$

$$W_{N_2} = e^{-j\frac{2\pi}{N_2}} \quad \cdots (4)$$

$$\sum_{n_1, n_2} = \sum_{n_1 = -M_1}^{M_1} \sum_{n_2 = -M_2}^{M_2} \quad \cdots (5)$$

FIG. 7

$$R(k_1,k_2) = \frac{F(k_1,k_2)\overline{G(k_1,k_2)}}{|F(k_1,k_2)\overline{G(k_1,k_2)}|}$$

$$= e^{j\{Q_F(k_1,k_2) - \theta_G(k_1,k_2)\}}$$

$$\cdots (6)$$

FIG. 8

$$F(k_1,k_2) = A_F(k_1,k_2)e^{j\theta_F(k_1,k_2)} \quad \cdots (7)$$

$$\begin{aligned} G(k_1,k_2) &= A_G(k_1,k_2)e^{j\theta_G(k_1,k_2)} \\ &\cong F(k_1,k_2)\cdot e^{-j\frac{2\pi}{N_1}k_1\delta_1}e^{-j\frac{2\pi}{N_2}k_2\delta_2} \quad \cdots (8) \end{aligned}$$

$$\begin{aligned} R(k_1,k_2) &= \frac{F(k_1,k_2)\overline{G(k_1,k_2)}}{|F(k_1,k_2)\overline{G(k_1,k_2)}|} \\ &\cong e^{j\frac{2\pi}{N_1}k_1\delta_1}e^{j\frac{2\pi}{N_2}k_2\delta_2} \quad \cdots (9) \end{aligned}$$

FIG. 11

$$\frac{\partial}{\partial k_1} \frac{\partial}{\partial k_2} e^{j\frac{2\pi}{N_1}k_1\delta_1} e^{j\frac{2\pi}{N_2}k_2\delta_2}$$

$$= -\delta_1 \delta_2 \frac{4\pi^2}{N_1 N_2} e^{j\frac{2\pi}{N_1}k_1\delta_1} e^{j\frac{2\pi}{N_2}k_2\delta_2} \quad \cdots (10)$$

$$\frac{\partial}{\partial k_1}\frac{\partial}{\partial k_2} e^{j\{\theta_F(k_1,k_2) - \theta_G(k_1,k_2)\}}$$

$$= \left[ j\frac{\partial}{\partial k_1}\frac{\partial}{\partial k_2}\{\theta_F(k_1,k_2) - \theta_G(k_1,k_2)\} \right.$$

$$\left. + \frac{\partial}{\partial k_1}\{\theta_F(k_1,k_2) - \theta_G(k_1,k_2)\}\frac{\partial}{\partial k_2}\{\theta_F(k_1,k_2) - \theta_G(k_1,k_2)\} \right]$$

$$e^{j\{\theta_F(k_1,k_2) - \theta_G(k_1,k_2)\}}$$

$$\cdots (11)$$

FIG. 13

$$R_e \{ e^{j\{\theta_F(k_1,k_2) - \theta_G(k_1,k_2)\}} \} \quad \cdots (12)$$

$$I_m \{ e^{j\{\theta_F(k_1,k_2) - \theta_G(k_1,k_2)\}} \} \quad \cdots (13)$$

$$\angle R(k_1,k_2) = \arctan \left( \frac{I_m \{ e^{j\{\theta_F(k_1,k_2) - \theta_G(k_1,k_2)\}} \}}{R_e \{ e^{j\{\theta_F(k_1,k_2) - \theta_G(k_1,k_2)\}} \}} \right)$$
$$\cdots (14)$$

FIG. 20

$$\left( \frac{\partial}{\partial k_1} e^{j\frac{2\pi}{N_1}k_1\delta_1} e^{j\frac{2\pi}{N_2}k_2\delta_2}, \frac{\partial}{\partial k_2} e^{j\frac{2\pi}{N_1}k_1\delta_1} e^{j\frac{2\pi}{N_2}k_2\delta_2} \right)$$

$$= \left( j\frac{2\pi\delta_1}{N_1} e^{j\frac{2\pi}{N_1}k_1\delta_1} e^{j\frac{2\pi}{N_2}k_2\delta_2}, j\frac{2\pi\delta_2}{N_2} e^{j\frac{2\pi}{N_1}k_1\delta_1} e^{j\frac{2\pi}{N_2}k_2\delta_2} \right)$$

$$\cdots (15)$$

$$\left| j\frac{2\pi\delta_1}{N_1} e^{j\frac{2\pi}{N_1}k_1\delta_1} e^{j\frac{2\pi}{N_2}k_2\delta_2} \right| + \left| j\frac{2\pi\delta_2}{N_2} e^{j\frac{2\pi}{N_1}k_1\delta_1} e^{j\frac{2\pi}{N_2}k_2\delta_2} \right|$$

$$= \frac{2\pi\delta_1}{N_1} + \frac{2\pi\delta_2}{N_2}$$

$$\cdots (16)$$

FIG. 21

$$\left( \frac{\partial}{\partial k_1} e^{j\{\theta_F(k_1,k_2) - \theta_G(k_1,k_2)\}}, \frac{\partial}{\partial k_2} e^{j\{\theta_F(k_1,k_2) - \theta_G(k_1,k_2)\}} \right)$$

$$= \left( j\frac{\partial}{\partial k_1}(\theta_F(k_1,k_2) - \theta_G(k_1,k_2)) e^{j\{\theta_F(k_1,k_2) - \theta_G(k_1,k_2)\}}, \right.$$

$$\left. \frac{\partial}{\partial k_2}(\theta_F(k_1,k_2) - \theta_G(k_1,k_2)) e^{j\{\theta_F(k_1,k_2) - \theta_G(k_1,k_2)\}} \right)$$

$$\cdots (17)$$

$$\left| j\frac{\partial}{\partial k_1}(\theta_F(k_1,k_2) - \theta_G(k_1,k_2)) e^{j\{\theta_F(k_1,k_2) - \theta_G(k_1,k_2)\}} \right|$$

$$+ \left| \frac{\partial}{\partial k_2}(\theta_F(k_1,k_2) - \theta_G(k_1,k_2)) e^{j\{\theta_F(k_1,k_2) - \theta_G(k_1,k_2)\}} \right|$$

$$= \left| \frac{\partial}{\partial k_1}(\theta_F(k_1,k_2) - \theta_G(k_1,k_2)) \right|$$

$$+ \left| \frac{\partial}{\partial k_2}(\theta_F(k_1,k_2) - \theta_G(k_1,k_2)) \right|$$

$$\cdots (18)$$

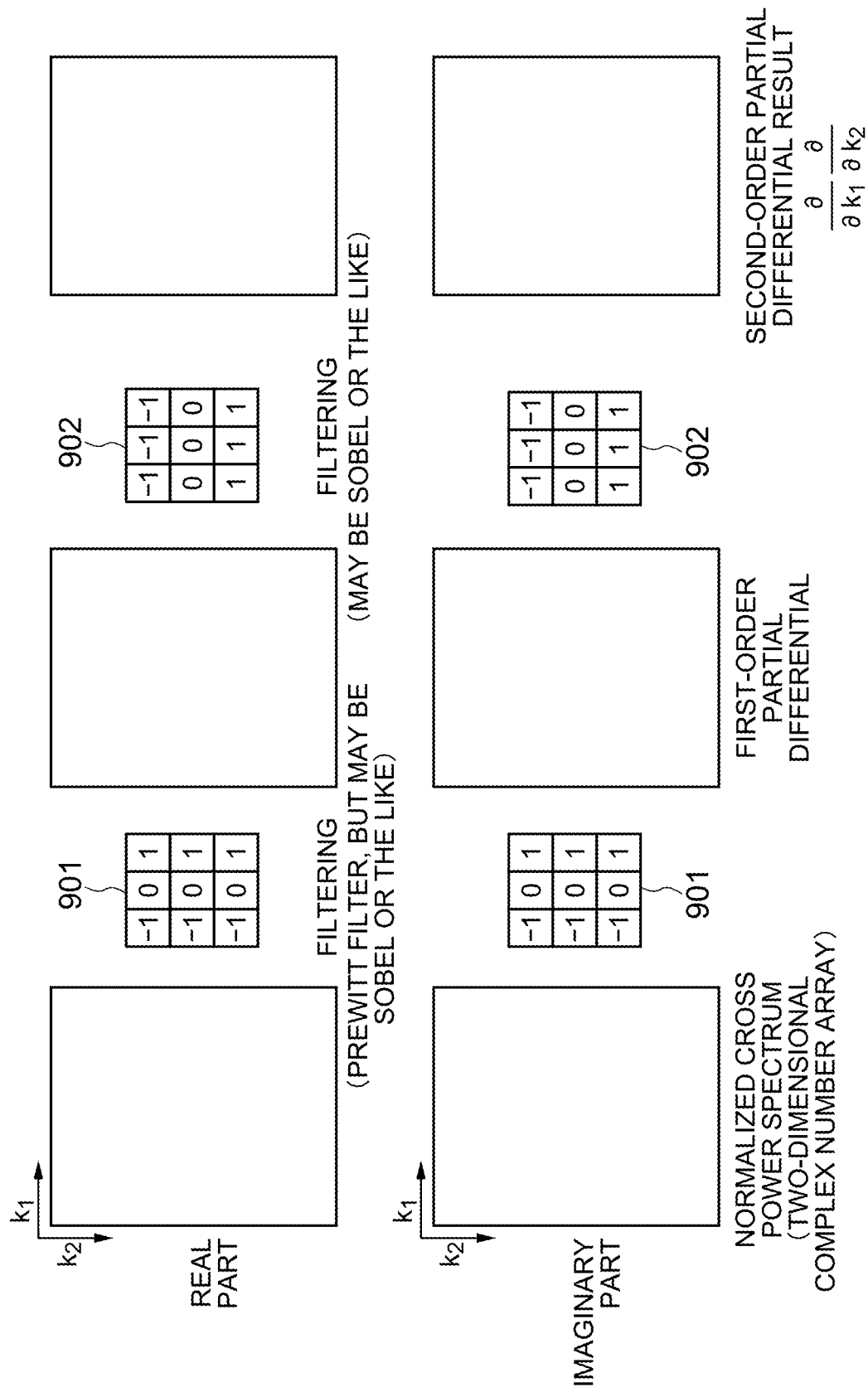

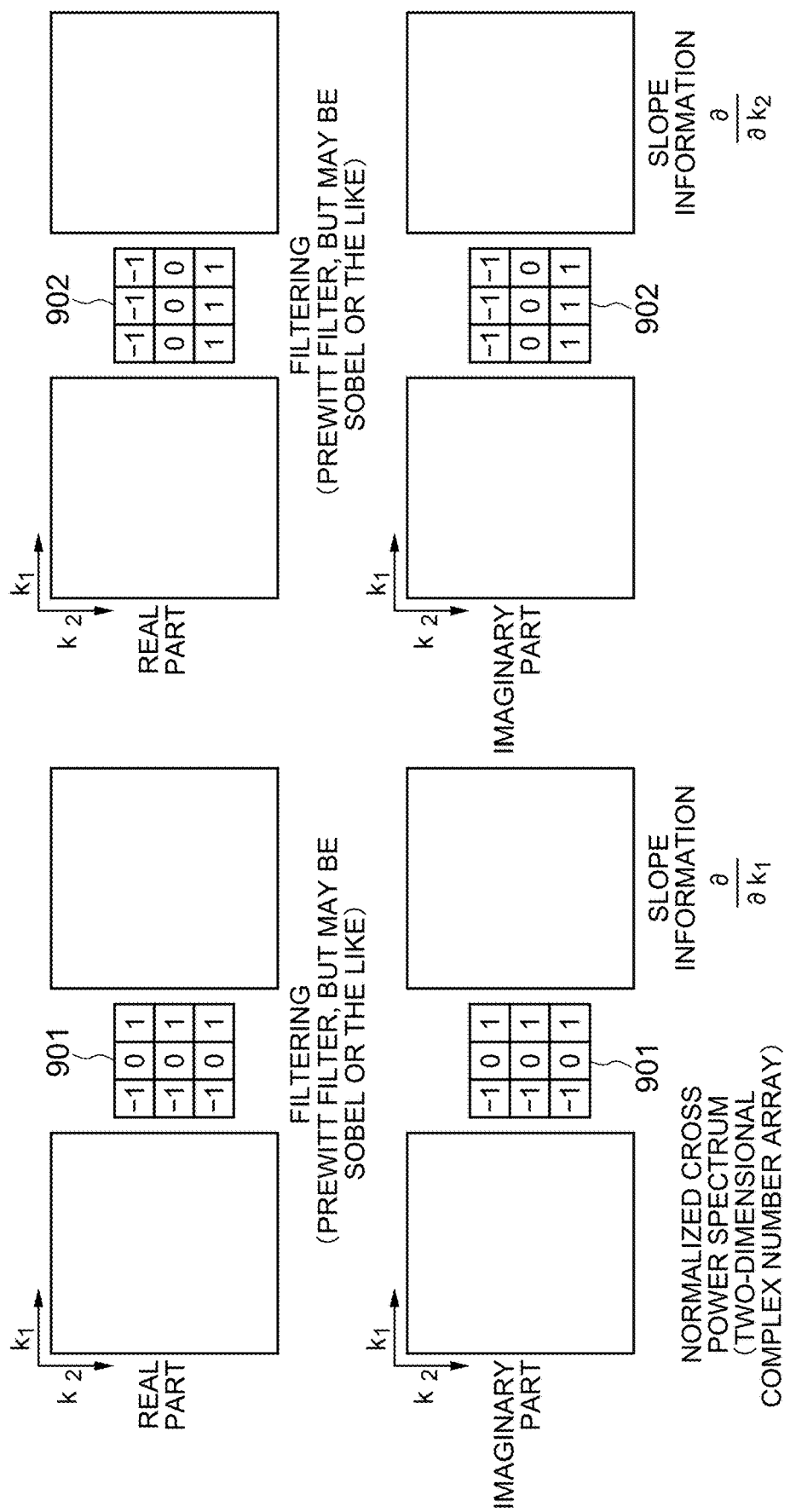

IMAGE COLLATING DEVICE

CROSS REFERENCE TO RELATED APPLICATIONS

This application is a National Stage of International Application No. PCT/JP2018/042334 filed Nov. 15, 2018, claiming priority based on Japanese Patent Application No. 2017-245795, filed Dec. 22, 2017 the disclosures of which are incorporated herein in their entirety by reference.

TECHNICAL FIELD

The present invention relates to an image collating device, an image collating method, and a recording medium.

BACKGROUND ART

Various image collating methods for collating a compared image and a registered image have been proposed or put into practical use for the purpose of individual identification or the like.

For example, in Patent Document 1, first of all, a compared image and a registered image are transformed into the frequency domain using the Fourier transform. Next, a cross power spectrum is calculated from the complex spectrums of the compared image and the registered image obtained by the above transform. Next, power components are eliminated from the cross power spectrum using a weight filter for each frequency, and the cross power spectrum is normalized to only phase components. Next, a correlation coefficient on the real coordinate domain is calculated by executing the inverse Fourier transform on the normalized one. Next, pattern matching determination is performed using coordinates at which the calculated correlation coefficient has the maximum value.

Further, in Patent Document 2, a registered Fourier image is generated by executing the Fourier transform on a registered image in advance. Next, a compared Fourier image is generated by executing the Fourier transform on a compared image. Next, the compared Fourier image and the registered Fourier image generated in advance are synthesized. Next, on the synthesized Fourier image, the amplitude suppression process is executed and thereafter the inverse Fourier transform is executed. Next, upper n pixels are extracted having higher correlation component intensity than a predetermined correlation component area appearing in the synthesized Fourier image after execution of the inverse Fourier transform. Then, based on the correlation component intensity of the extracted n pixels, it is determined whether or not the registered image matches the compared image.

On the other hand, as another technique relating to the present invention, the following is known.

Patent Document 3 describes a technique for measuring a misalignment between two images that are identical to each other. To be specific, to the respective pattern signals corresponding to two N-dimensional patterns to be collated, m types (m is an integer satisfying m ≥N) of pieces of phase information indicating phase traveling directions that are non-parallel to each other are given. Next, a correlation between m sets of pattern signals with the same phase information given is obtained. Then, based on the phase information of the obtained correlation of the m sets, a misalignment between the patterns is obtained. The technique described in Patent Document 3 is a technique for measuring a misalignment between two N-dimensional patterns that are identical to each other, and is not a technique for collating two N-dimensional patterns that it is unknown whether or not to be identical to each other.

Patent Document 1: Japanese Unexamined Patent Application Publication No. JP-A 2008-015848
Patent Document 2: Japanese Patent No. 3254622
Patent Document 3: Japanese Patent No. 5558127

As described in Patent Documents 1 and 2, it has been general to, when collating two images, synthesize the frequency characteristics of the two images and use the result of executing the inverse Fourier transform on the synthesized frequency characteristics. However, the inverse Fourier transform requires a large amount of operation. Therefore, it is difficult to collate two images at high speeds.

SUMMARY

An object of the present invention is to provide an image collating device that solves the above problem.

An image collating device according to an aspect of the present invention is an image collating device that collates a first image and a second image. The image collating device includes: a frequency characteristic acquiring unit configured to acquire a frequency characteristic of the first image and a frequency characteristic of the second image; a frequency characteristic synthesizing unit configured to generate a synthesized frequency characteristic by synthesizing the frequency characteristic of the first image and the frequency characteristic of the second image; and a determining unit configured to calculate a score indicating a degree to which the synthesized frequency characteristic is a wave having a single period, and collate the first image and the second image based on the score.

An image collating method according to another aspect of the present invention is an image collating method for collating a first image and a second image. The image collating method includes: acquiring a frequency characteristic of the first image and a frequency characteristic of the second image; generating a synthesized frequency characteristic by synthesizing the frequency characteristic of the first image and the frequency characteristic of the second image; calculating a score indicating a degree to which the synthesized frequency characteristic is a wave having a single period; and collating the first image and the second image based on the score.

A non-transitory computer-readable recording medium according to another aspect of the present invention stores a program including instructions for causing a computer collating a first image and a second image to execute: a process of acquiring a frequency characteristic of the first image and a frequency characteristic of the second image; a process of generating a synthesized frequency characteristic by synthesizing the frequency characteristic of the first image and the frequency characteristic of the second image; and a process of calculating a score indicating a degree to which the synthesized frequency characteristic is a wave having a single period, and collating the first image and the second image based on the score.

With the configurations described above, the present invention allows for collation between the first image and the second image at high speeds.

BRIEF DESCRIPTION OF DRAWINGS

FIG. 5 is a view showing an example of equations showing the frequency characteristic of a first image and the frequency characteristic of a second image;

FIG. 7 is a view showing an example of an equation for calculating a normalized cross power spectrum;

FIG. 8 is a view showing an example of equations showing a frequency characteristic $F(k_1, k_2)$, a frequency characteristic $G(k_1, k_2)$, and a normalized cross power spectrum $R(k_1, k_2)$ of a pair of identical images with misalignment;

FIG. 11 is a view showing an example of calculation of the second-order partial differential of the normalized cross power spectrum;

FIG. 13 is a view showing an example of expressions for calculating a phase angle of each element of the normalized cross power spectrum;

FIG. 20 is a view showing an example of calculation of the slope of the normalized cross power spectrum of a pair of identical images and the absolute value thereof;

FIG. 21 is a view showing an example of calculation of the slope of the normalized cross power spectrum of a pair of different images and the absolute value thereof;

FIG. 23 is a view showing an example of processing executed by a second-order partial differential calculation part; and FIG. 24 is a view showing an example of processing executed by a slope calculation part.

EXAMPLE EMBODIMENTS

Figure 1:
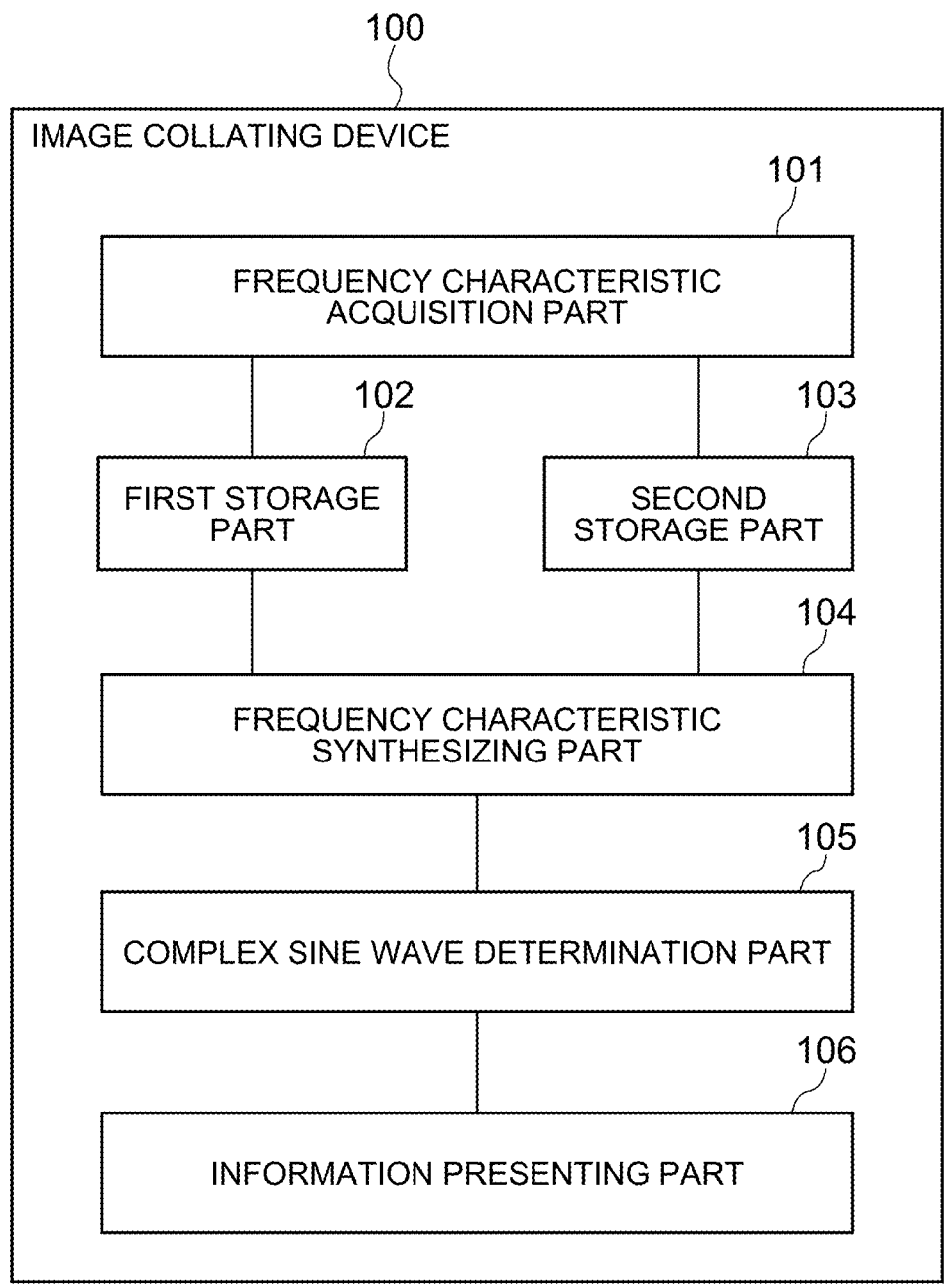
FIG. 1 is a block diagram of an image collating device according to a first example embodiment of the present invention.

Next, example embodiments of the present invention will be described in detail referring to the drawings.

First Example Embodiment

FIG. 1 is a block diagram of an image collating device according to a first example embodiment of the present invention. An image collating device 100 according to this example embodiment is configured to collate a first image and a second image. Referring to FIG. 1, the image collating device 100 includes a frequency characteristic acquisition part 101, a first storage part 102, a second storage part 103, a frequency characteristic synthesizing part 104, a complex sine wave determination part 105, and an information presenting part 106.

The frequency characteristic acquisition part 101 is configured to acquire frequency characteristics of the first image and the second image. A frequency characteristic is two-dimensional data (two-dimensional array) that is the result of executing the Fourier transform (discrete Fourier transform) on an image and thereby transforming into a frequency domain. The frequency characteristic acquisition part 101 may execute Frequency transform other than the Fourier transform, for example, wavelet transform.

Herein, a first image is a compared image obtained by imaging a comparison target object. A second image is one of a plurality of registered images obtained by imaging a plurality of registration target objects. There is one or more second image. An object is, for example, an industrial product, a commercial product, or the like. On the surface of the object, there are naturally generated fine patterns such as fine irregularities and patterns or random patterns on the material surface, which are generated in the same manufacturing process. By acquiring the difference of the patterns on the object surface as an image using an imaging device such as a camera, and recognizing the fine patterns, it is possible to perform individual identification and management of each product. This example embodiment relates to an image collation technique for such individual identification.

The first storage part 102 is configured to store the frequency characteristic of the first image. The second storage part 103 is configured to store the frequency characteristic of the second image.

The frequency characteristic synthesizing part 104 is configured to calculate a normalized cross power spectrum of the frequency characteristic of the first image stored in the first storage part 102 and the frequency characteristic of the second image stored in the second storage part 103.

The complex sine wave determination part 105 is configured to calculate a score indicating a degree to which the normalized cross power spectrum calculated by the frequency characteristic synthesizing part 104 is a complex sine wave signal having a single period. The complex sine wave determination part 105 is also configured to collate the first image and the second image based on the calculated score. That is, the complex sine wave determination part 105 uses the score indicating a degree to which the normalized cross power spectrum is a complex sine wave signal having a single period, as a score indicating the degree of similarity between the first image and the second image.

The information presenting part 106 is configured to present the result of collation of the first image and the second image based on the result of determination by the complex sine wave determination part 105. Presentation of the collation result may be displaying the collation result on a display device, or printing out a sheet of paper on which the collation result is described with a printing device, or transmitting a message describing the collation result to an external terminal via a communication device.

Figure 2:
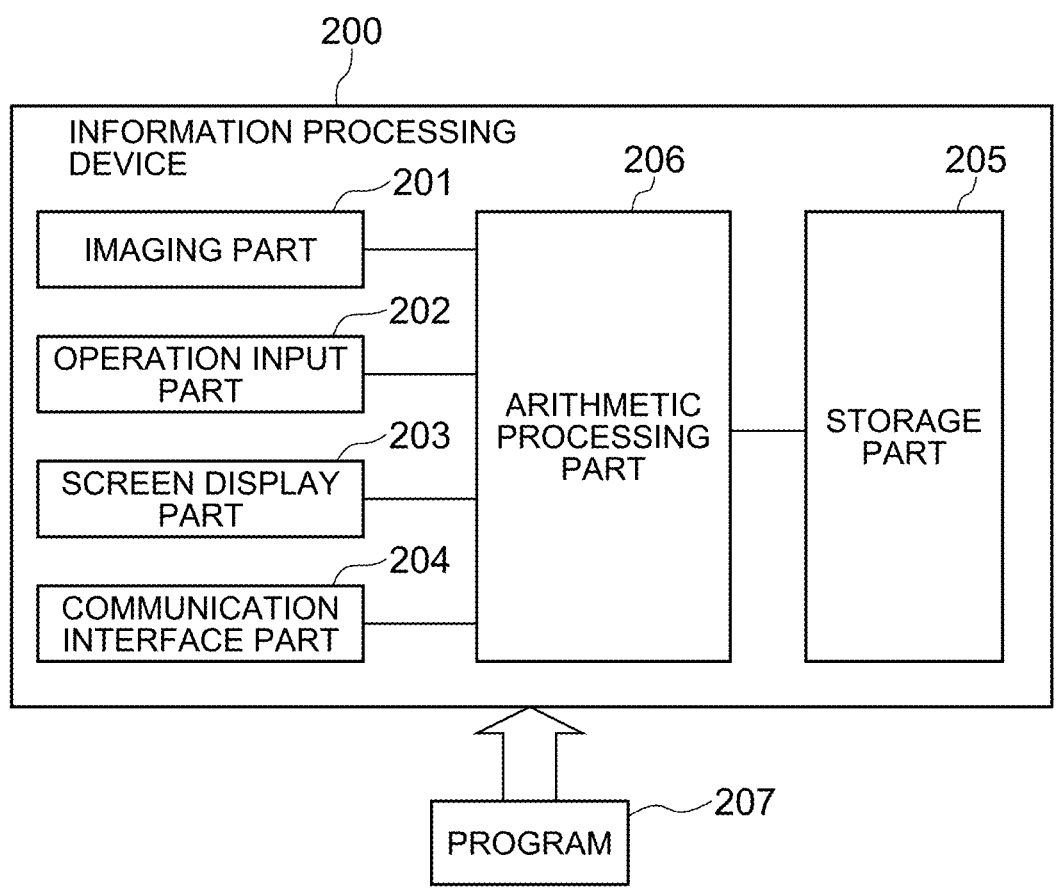
FIG. 2 is a block diagram showing an example of the hardware configuration of the image collating device according to the first example embodiment of the present invention.

For example, as shown in FIG. 2, the image collating device 100 can be realized by an image processing device 200 and a program 207. The image processing device 200 has an imaging part 201 such as a camera, an operation input part 202 such as a keyboard or a mouse, a screen display part 203 such as a liquid crystal display, a communication interface part 204, a storage part 205 such as a memory or a hard disk, and an arithmetic processing part 206 such as one or more microprocessors. The information processing device 200 may be, for example, a personal computer or a smartphone.

The program 207 is loaded from an external computer-readable recording medium, for example, when the information processing device 200 is started, and controls the operation of the arithmetic processing part 206 and thereby realizes functional units such as the frequency characteristic acquisition part 101, the first storage part 102, the second storage part 103, the frequency characteristic synthesizing part 104, the complex sine wave determination part 105, and the information presenting part 106 on the arithmetic processing part 206.

Next, the outline of the operation of the image collating device 100 according to this example embodiment will be described.

Figure 3:
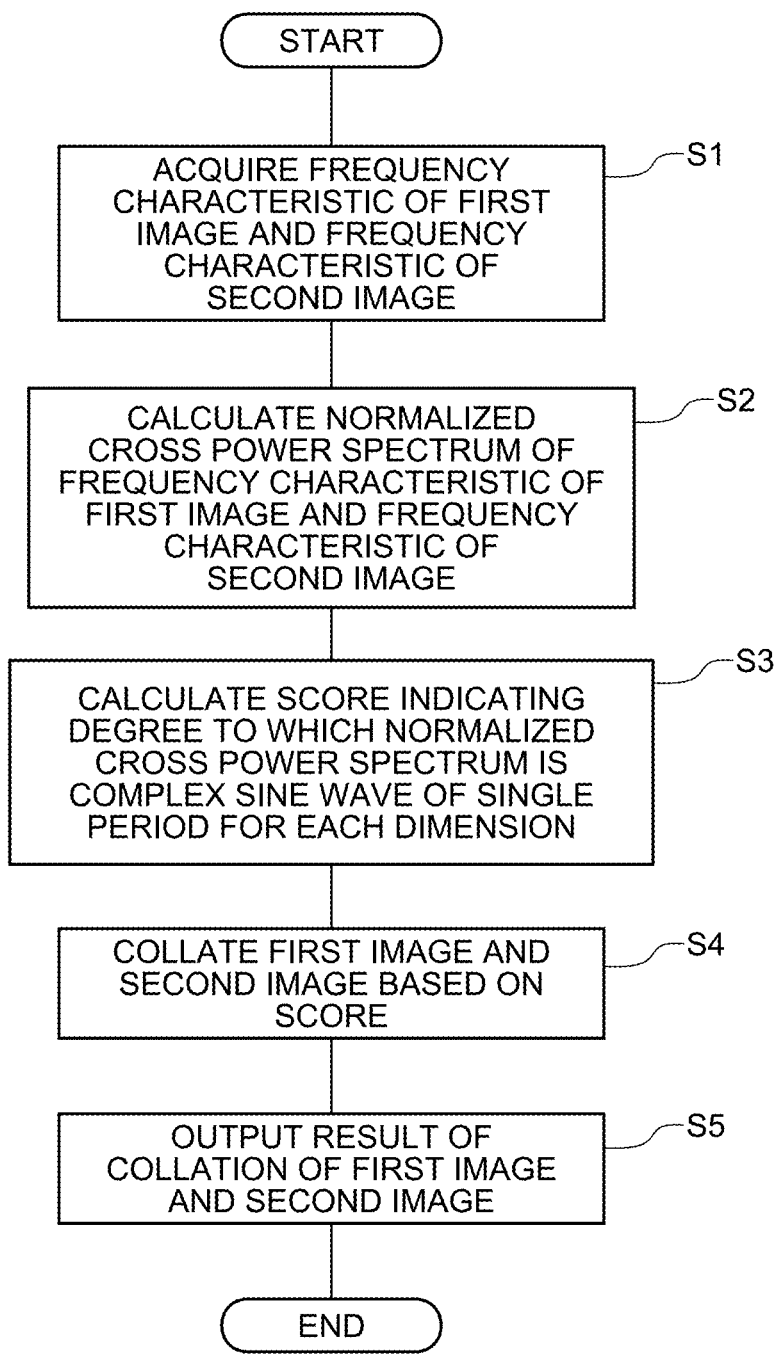
FIG. 3 is a flowchart showing the outline of the operation of the image collating device according to the first example embodiment of the present invention.

FIG. 3 is a flowchart showing the outline of the operation of the image collating device 100. First, the frequency characteristic acquisition part 101 acquires the frequency characteristic of the first image and the frequency characteristic of the second image (step S1). In a case where there are a plurality of second images, the frequency characteristic acquisition part 101 acquires the frequency characteristic from each of the second images. The frequency characteristic acquisition part 101 stores the acquired frequency characteristic of the first image into the first storage part 102, and stores the frequency characteristic of the second image into the second storage part.

Next, the frequency characteristic synthesizing part 104 calculates a normalized cross power spectrum of the frequency characteristic of the first image stored in the first image storage part 102 and the frequency characteristic of the second image stored in the second storage part 103 (step S2). In a case where there are a plurality of frequency characteristics of the second images, the frequency characteristic synthesizing part 104 calculates a plurality of normalized cross power spectrums of the frequency characteristic of the first image and the respective frequency characteristics of the second images.

Next, the complex sine wave determination part 105 calculates a score indicating a degree to which the normalized cross power spectrum acquired from the frequency characteristic synthesizing part 104 is a complex sine wave having a single period (step S3). In a case where there are a plurality of normalized cross power spectrums, the complex size wave determination part 105 calculates, for each of the normalized cross power spectrums, a score indicating a degree to which the normalized cross power spectrum is a complex sine wave having a single period.

Next, the complex sine wave determination part 105 collates the first image and the second image based on the calculated score (step S4).

For example, in a case where there is one second image, when the score satisfies a given criterion value, the complex sine wave determination part 105 derives a collation result that the first image and the second image match (are identical). On the other hand, when the score does not satisfy the given criterion, the complex sine wave determination part 105 derives a collation result that the first image and the second image do not match (are not identical).

Further, for example, in a case where there are a plurality of second images, when the best score of the calculated scores satisfies a given criterion value, the complex sine wave determination part 105 derives a collation result that the first image and the second image with the best score match (are identical). On the other hand, when the best score does not satisfy the given criterion value, the complex sine wave determination part 105 derives a collation result that the first image and the second images do not match (are not identical).

Next, the information presenting part 106 presents the result of collation of the first image and the second image obtained from the complex sine wave determination part 105 (step S5).

Next, the respective parts of the image collating device 100 according to this example embodiment will be described in detail.

First, the frequency characteristic acquisition part 101 will be described in detail.

Figure 4:
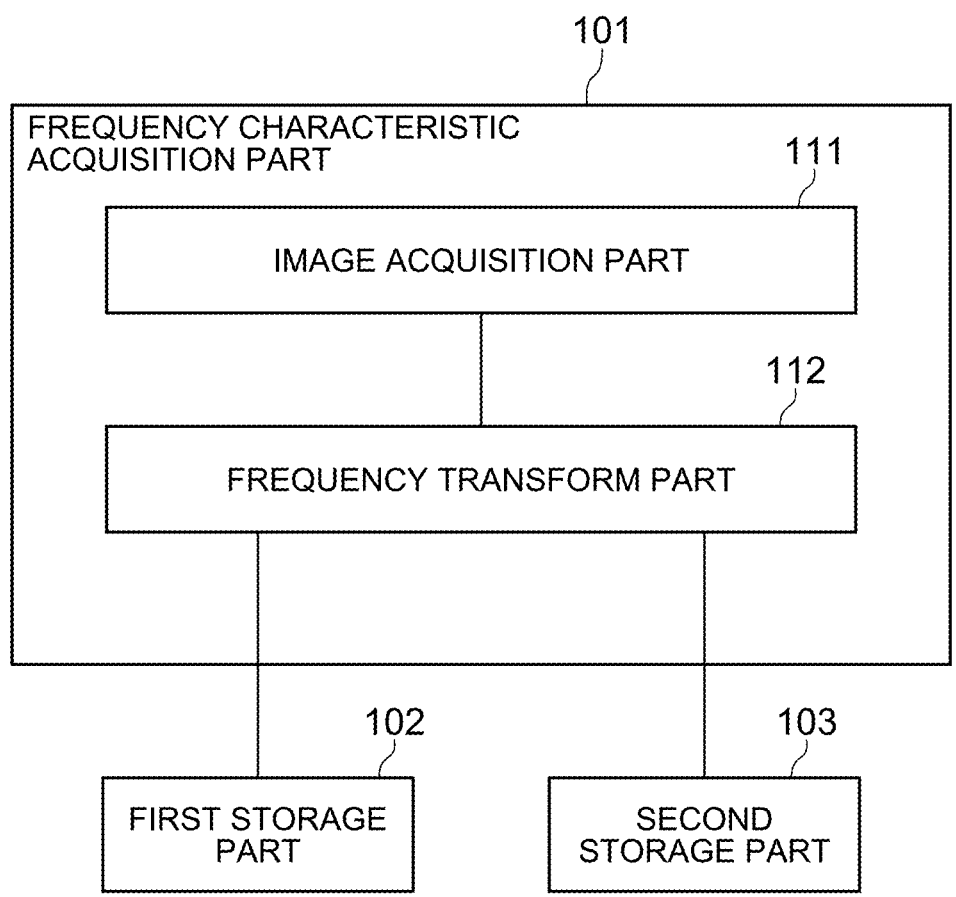
FIG. 4 is a block diagram showing an example of a frequency characteristic acquisition part in the image collating device according to the first example embodiment of the present invention.

FIG. 4 is a block diagram showing an example of the frequency characteristic acquisition part 101. The frequency characteristic acquisition part 101 includes an image acquisition part 111 and a frequency transform part 112.

The image acquisition part 111 is configured to acquire the first image and the second image. The image acquisition part 111 can be imaging equipment as represented by a camera and a scanner, for example. Alternatively, the image acquisition part 111 may be an optical sensor that collects visible light, near-infrared light and short-wavelength infrared light that have longer wavelengths than visible light, and light up to the thermal infrared region with a lens, and acquires the shape and so on of a target object as image data. Alternatively, the image acquisition part 111 may be a sensor that acquires the intensity of infrared light, ultraviolet light, and X-ray, and outputs the acquired intensity as a two-dimensional data array. Alternatively, the image obtaining part 111 may be configured to acquire the first image and the second image from an external storage medium such as a CD-ROM or a memory. Alternatively, the image acquisition part 111 may be configured to receive the first image and the second image via a network. Moreover, the image acquisition part 111 may acquire the first image and the second image by different methods, respectively.

The frequency transform part 112 is configured to receive the first image and the second image from the image acquisition part 111 and output an image (a frequency spectrum image) obtained by executing discrete Fourier transform on the respective images. The frequency transform part 112 stores the frequency spectrum image of the first image as a first frequency characteristic into the first storage part 102, and stores the frequency spectrum image of the second image as a second frequency characteristic into the second storage part 103.

Next, an example of the frequency characteristics of the first image and second image acquired by the frequency characteristic acquisition part 101 will be described.

It is assumed that the first image and the second image are two images $f(n_1, n_2)$ and $g(n_1, n_2)$ of $N_1 \times N_2$ pixels. It is also assumed that the discrete space indexes (integers) of two-dimensional image signals are $n_1 = -M_1, \ldots, M_1$ and $n_2 = -M_2, \ldots, M_2$. Herein, $M_1$ and $M_2$ are positive integers, and $n_1 = 2M_1 + 1$ and $N_2 = 2M_2 + 1$. Then, a first frequency characteristic $F(k_1, k_2)$ obtained by executing two-dimensional discrete Fourier transform on the image $f(n_1, n_2)$ and a second frequency characteristic $G(k_1, k_2)$ obtained by executing two-dimensional discrete Fourier transform on the image $g(n_1, n_2)$ are given by Equation 1 and Equation 2 shown in FIG. 5. In Equation 1 and Equation 2, $k_1 = -M_1, \ldots, M_1$ and $k_2 = -M_2, \ldots, M_2$ are discrete frequency indexes (integers). $W_{N1}$ and $W_{N2}$ are twiddle factors, which are given by Equation 3 and Equation 4 shown in FIG. 5. $A_F(k_1, k_2)$ and $A_G(k_1, k_2)$ represent amplitude spectrums (amplitude components), and $\theta_F(k_1, k_2)$ and $\theta_G(k_1, k_2)$ represent phase spectrums (phase components). $\Sigma_{n1, n2}$ represents addition over the entire range of the indexes as shown by Equation 5 in FIG. 5.

Figure 6:
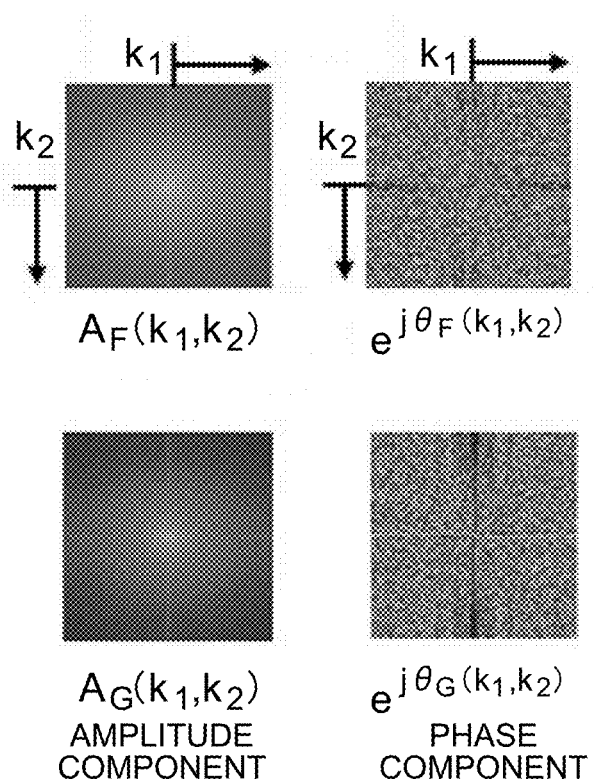
FIG. 6 is a view showing an example of images of amplitude components $A_F(k_1, k_2)$ and $A_G(k_1, k_2)$ and phase components $\theta_F(k_1, k_2)$ and $\theta_G(k_1, k_2)$.

FIG. 6 shows an example of images of the amplitude components $A_F(k_1, k_2)$ and $A_G(k_1, k_2)$ and the phase components $\theta_F(k_1, k_2)$ and $\theta_G(k_1, k_2)$.

Next, the frequency characteristic synthesizing part 104 will be described in detail.

The frequency characteristic synthesizing part 104 calculates the normalized cross power spectrum $R(k_1, k_2)$ of the first frequency characteristic $F(k_1, k_2)$ and the second frequency characteristic $G(k_1, k_2)$ by Equation 6 shown in FIG. 7. In Equation 6, overline $G(k_1, k_2)$ is the complex conjugate of the second frequency characteristic $G(k_1, k_2)$. Moreover, $\theta_F(k_1, k_2 - \theta G(k_1, k_2)$ is a phase difference spectrum between the first frequency characteristic and the second frequency characteristic. As shown in Equation 6, the frequency characteristic synthesizing part 104 obtains a cross power spectrum, which is the product of the first frequency characteristic $F(k_1, k_2)$ and the complex conjugate of the second frequency characteristic $G(k_1, k_2)$ for each element, and normalizes it by its absolute value, thereby calculating a normalized cross power spectrum.

In a case where the image $f(n_1, n_2)$ and the image $g(n_1, n_2)$ are a pair of identical images with misalignment, the frequency characteristic $F(k_1, k_2)$ of the image $f(n_1, n_2)$, the frequency characteristic $G(k_1, k_2)$ of the image $g(n_1, n_2)$, and the normalized cross power spectrum $R(k_1, k_2)$ of the frequency characteristics are given by Equation 7, Equation 8, and Equation 9 shown in FIG. 8. Herein, $\delta_1$ and $\delta_2$ are the amounts of misalignment between the image $f(n_1, n_2)$ and the image $g(n_1, n_2)$. That is, the image $g(n_1, n_2)$ is an image obtained by translating the image $f(n_1, n_2)$ by $(\delta_1, \delta_2)$. As shown in Equation 9, in a case where the two frequency characteristics $F(k_1, k_2)$ and $G(k_1, k_2)$ to be collated are a pair of identical images, the normalized cross power spectrum $R(k_1, k_2)$ is expressed as a complex sine wave having a single period for each dimension (for each of $k_1$ and $k_2$). On the other hand, in a case where the two frequency characteristics $F(k_1, k_2)$ and $G(k_1, k_2)$ to be collated are not a pair of identical images, the normalized cross power spectrum $R(k_1, k_2)$ is not expressed as a complex sine wave having a single period for each dimension.

Figure 9:
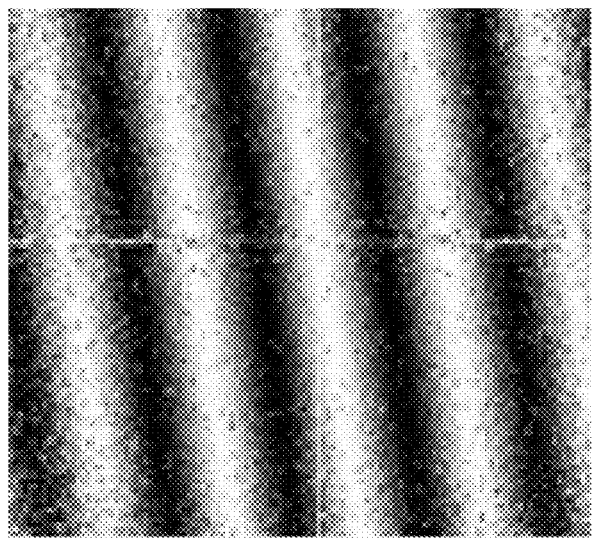
FIG. 9 is a view showing an example of an image of the normalized cross power spectrum $R(k_1, k_2)$ of the pair of identical images.

FIG. 9 shows an example of an image of the normalized cross power spectrum $R(k_1, k_2)$ of a pair of identical images. As apparent from FIG. 9, the normalized cross power spectrum of a pair of identical images is an image like a wave having a single period when bright spots are regarded as peaks and dark spots are regarded as valleys.

Next, the complex sine wave determination part 105 will be described in detail.

Figure 10:
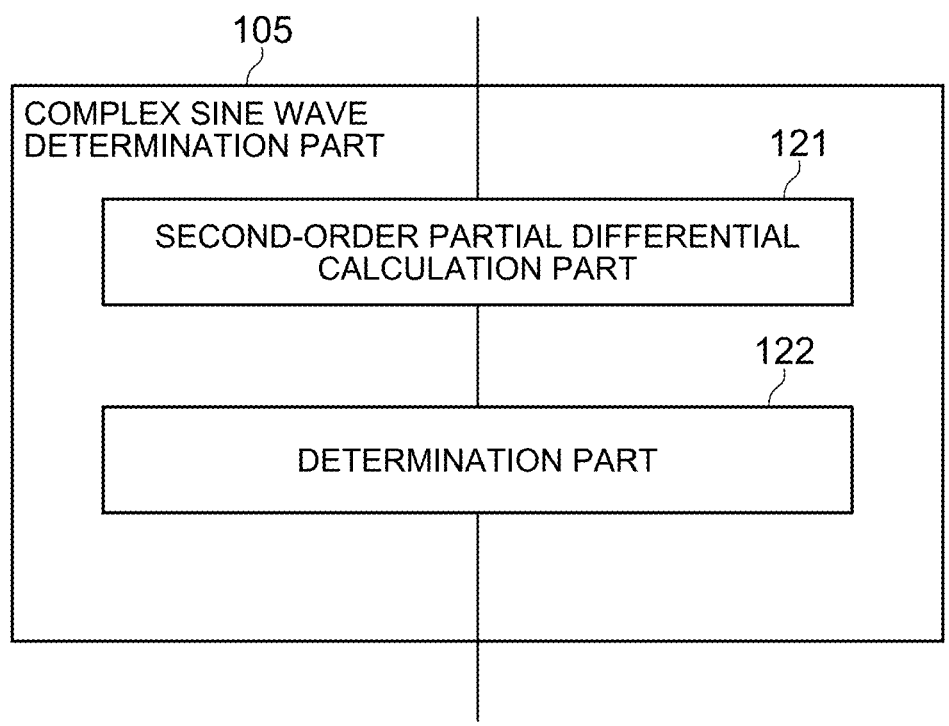
FIG. 10 is a block diagram showing an example of a complex sine wave determination part in the image collating device according to the first example embodiment of the present invention.

FIG. 10 is a block diagram showing an example of the complex sine wave determination part 105. The complex sine wave determination part 105 in this example includes a second-order partial differential calculation part 121 and a determination part 122.

The second-order partial differential calculation part 121 is configured to calculate a second-order partial differential value for each element of the normalized cross power spectrum obtained from the frequency characteristic synthesizing part 104. The second-order partial differential value of each element of the normalized cross power spectrum is, mathematically describing, obtained by partially differentiating the normalized cross power spectrum with one of the discrete frequency indexes $k_1$ and $k_2$, and partially differentiating the result of the partial differentiation with the other discrete frequency index. Actually, the second-order partial differential calculation part 121 calculates the second-order partial differential value of each element of the normalized cross power spectrum in the following manner. First, the second-order partial differential calculation part 121 calculates, for each element of the normalized cross power spectrum, a difference between the normalized cross power spectrum value of the element and that of an element adjacent to the element in one discrete frequency index direction. Then, the second-order partial differential calculation part 121 holds the calculated difference value as a first-order partial differential value of the element. Next, the second-order partial differential calculation part 121 calculates, for each element of the normalized cross power spectrum, a difference between the first-order partial differential value of the element and that of an element adjacent to the element in the other discrete frequency index direction. Then, the second-order partial differential calculation part 121 outputs the calculated difference value as the second-order partial differential value of the element. Alternatively, more preferably, as shown in FIG. 23, the second-order partial differential calculation part 121 applies, for each element of the normalized cross power spectrum, a 3×3 Prewitt filter 901, for example, as shown in FIG. 23 to a real part and an imaginary part, respectively, and thereby acquires a first-order partial differential value. Next, the second-order partial differential calculation part 121 acquires a second-order partial differential value by applying a 3×3 Prewitt filter as shown in FIG. 23 to the acquired first-order partial differential value. Herein, the filter 901 performs differentiation in the $k_1$ direction and smoothing in the $k_2$ direction. A filter 902 performs differentiation in the $k_2$ direction and smoothing in the $k_1$ direction. Instead of the 3×3 Prewitt filter, a 3×3 Sobel filter or the like may be used. The amount of operation for calculating the second-order partial differential value of each element of the normalized cross power spectrum is much smaller than the amount of operation for executing the inverse Fourier transform of the normalized cross power spectrum. A specific example will be described below using the equations.

As described above, in a case where two frequency characteristics to be collated are identical images (identical patterns) with misalignment on image data before frequency transform, the normalized cross power spectrum R ($k_1$, $k_2$) of the first frequency characteristic F ($k_1$, $k_2$) and the second frequency characteristic G ($k_1$, $k_2$) is given by Equation 9 shown in FIG. 8. Equation 10 in FIG. 11 shows an example of calculation of the second-order partial differential of the normalized cross power spectrum of identical image data, which is calculated by differentiating the right side of Equation 9 with $k_1$ and $k_2$. The absolute value is constant regardless of $k_1$ and $k_2$ (discrete frequency indexes). Since the absolute value of the second-order partial differential value thus becomes constant irrespective of $k_1$ and $k_2$, the dispersion thereof becomes less than a predetermined threshold value.

On the other hand, in a case where two frequency characteristics to be collated are mutually different images (different patterns), the normalized cross power spectrum R ($k_1$, $k_2$) of the first frequency characteristic F ($k_1$, $k_2$) and the second frequency characteristic G ($k_1$, $k_2$) is given by Equation 6 shown in FIG. 7. Equation 11 in FIG. 11 shows an example of calculation of the second-order partial differential of the normalized cross power spectrum of mutually different images, which is calculated by differentiating the right side of Equation 6 with $k_1$ and $k_2$. The absolute value varies depending on $k_1$ and $k_2$ (discrete frequency indexes). Since the absolute value of the second-order partial differential value thus varies, the dispersion value thereof becomes equal to or more than the predetermined threshold value.

The determination part 122 takes the absolute values of the second-order partial differential values of the respective elements of the normalized cross power spectrum calculated by the second-order partial differential calculation part 121, and calculates the dispersion of the absolute values. In a case where the normalized cross power spectrum is a complex sine wave having a single period for each dimension, the absolute values of the second-order partial differential values of the respective elements becomes constant on the frequency axis as described above. On the other hand, in a case where the normalized cross power spectrum is not a complex sine wave having a single period for each dimension, the absolute values of the second partial differential values of the respective elements irregularly vary on the frequency axis as described above. For this reason, the dispersion of the absolute values of the second-order partial differential values of the respective elements of the normalized cross power spectrum can be used as a score indicating a degree to which the normalized cross power spectrum is a complex sine wave having a single period for each dimension. Available. Then, the determination part 122 collates the first image and the second image based on the calculated dispersion (score). For example, in a case where the dispersion (score) is less than a predetermined threshold value, the determination part 122 determines that the first image and the second image are identical. On the other hand, in a case where the dispersion (score) is equal to or more than the threshold value, the determination part 122 determines that the first image and the second image are not identical. In a case where there are a plurality of second images, the determination part 122 selects a second image having the best score and performs the above determination. Although the dispersion is used as the score herein, the standard deviation may be used as the score, or another value indicating the dispersion may be used as the score. That is, in the present invention including this example embodiment and all of the following example embodiments, using dispersion as a score includes not only using original dispersion as a score but also using standard deviation as a score, and using another value indicating dispersion as a score.

The complex sine wave determination part 105 shown in FIG. 10 does not calculate a phase angle. Therefore, as compared with the complex sine wave determination part described in the other example embodiment in which a phase angle is obtained to be described later, the amount of operation required for collation is small, and the result of collation can be derived at high speeds.

Thus, the image collating device 100 according to this example embodiment can determine collation of the first image and the second image at high speeds. The reason is that the image collating device 100 according to this example embodiment executes frequency transform on the first image and the second image to acquire the frequency characteristic of the first image and the frequency characteristic of the second image, synthesizes the two frequency characteristics to calculate a normalized cross power spectrum, calculate a score indicating a degree to which the normalized cross power spectrum is a complex sine wave having a single period, and collates the first image and the second image based on the score, so that the inverse Fourier transform that requires a large amount of operation is not required.

Second Example Embodiment

Next, an image collating device according to a second example embodiment of the present invention will be described. An image collating device 300 according to this example embodiment is the same as the image collating device 100, and is different in the complex sine wave determination part 105 from the image collating device 100.

Figure 12:
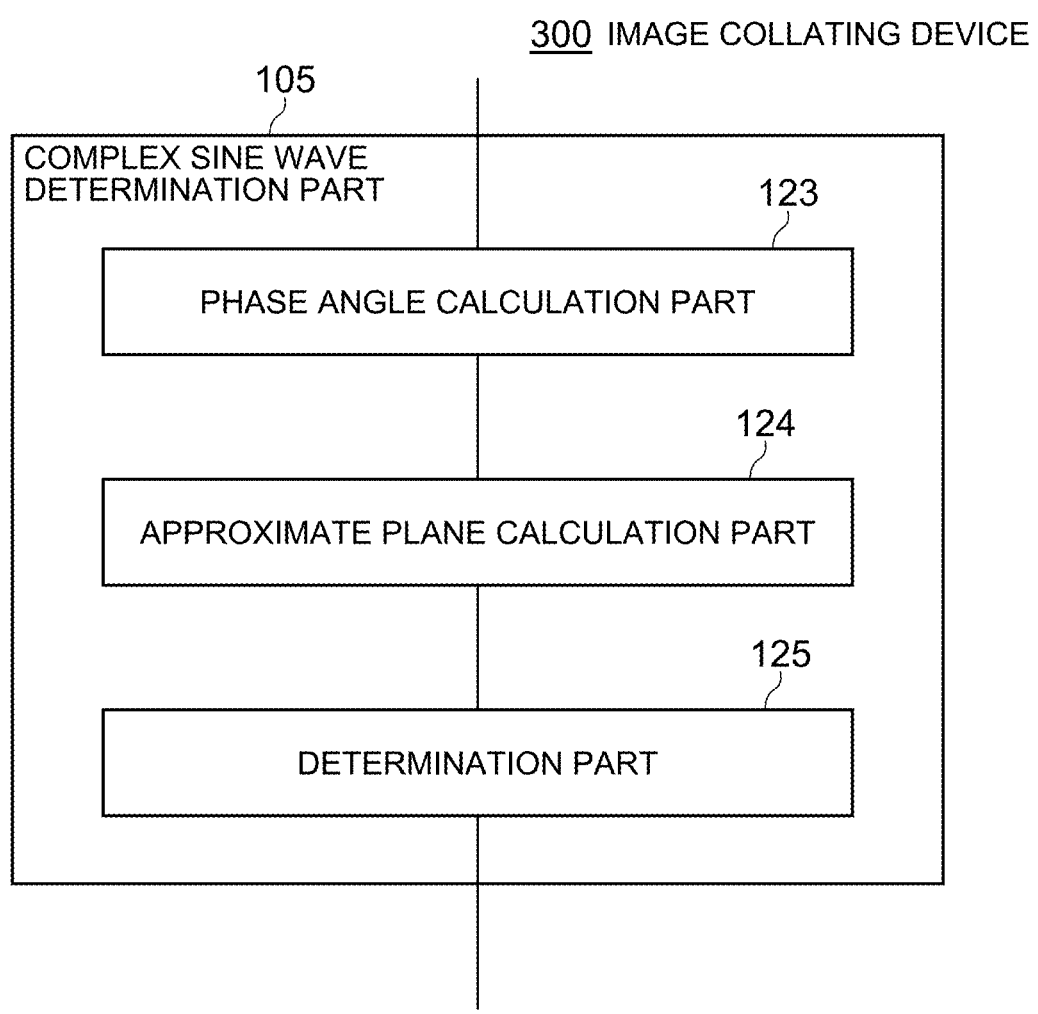
FIG. 12 is a block diagram showing an example of a complex sine wave determination part in an image collating device according to a second example embodiment of the present invention.

FIG. 12 is a block diagram of the complex sine wave determination part 105 in the image collating device 300 according to this example embodiment. The complex sine wave determination part 105 of this example includes a phase angle calculation part 123, an approximate plane calculation part 124, and a determination part 125.

The phase angle calculation part 123 is configured to calculate a phase angle $\angle R$ ($k_1$, $k_2$) of each element of the normalized cross power spectrum obtained from the frequency characteristic synthesizing part 104. FIG. 13 shows an example of an equation for calculating a phase angle $\angle R$ ($k_1$, $k_2$). When the real part of each element of the cross power spectrum is given by Expression 12 and the imaginary part is given by Expression 13, the phase angle $\angle R$ ($k_1$, $k_2$) of each element is given by Equation 14.

The approximate plane calculation part 124 is configured to calculate an approximate plane from the phase angles of the respective elements of the normalized cross power spectrum obtained by the phase angle calculation part 123. The approximate plane herein is, when an element group of the normalized cross power spectrum is three-dimensional point cloud data in which each element is composed of three-dimensional data ($k_1$, $k_2$, $\angle R$ ($k_1$, $k_2$)) of $k_1$, $k_2$, and $\angle R$ ($k_1$, $k_2$), a plane that minimizes the sum of squared distances to the point cloud. The approximate plane is also called a least squares plane.

Figure 14:
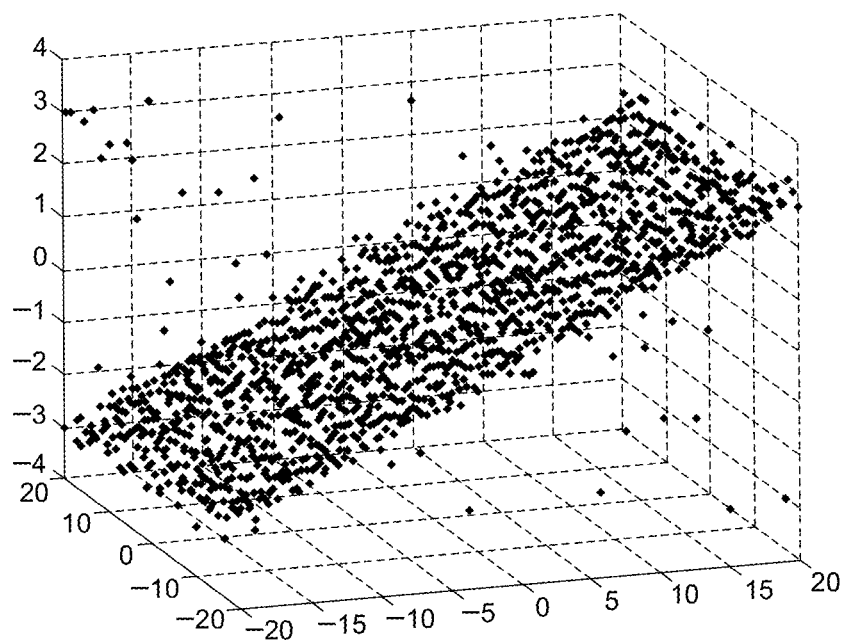
FIG. 14 is a view showing an example of a triaxial graph showing the distribution of three-dimensional points data of normalized cross power spectrum data in a case where the normalized cross power spectrum is a complex sine wave having a single period for each dimension.
Figure 15:
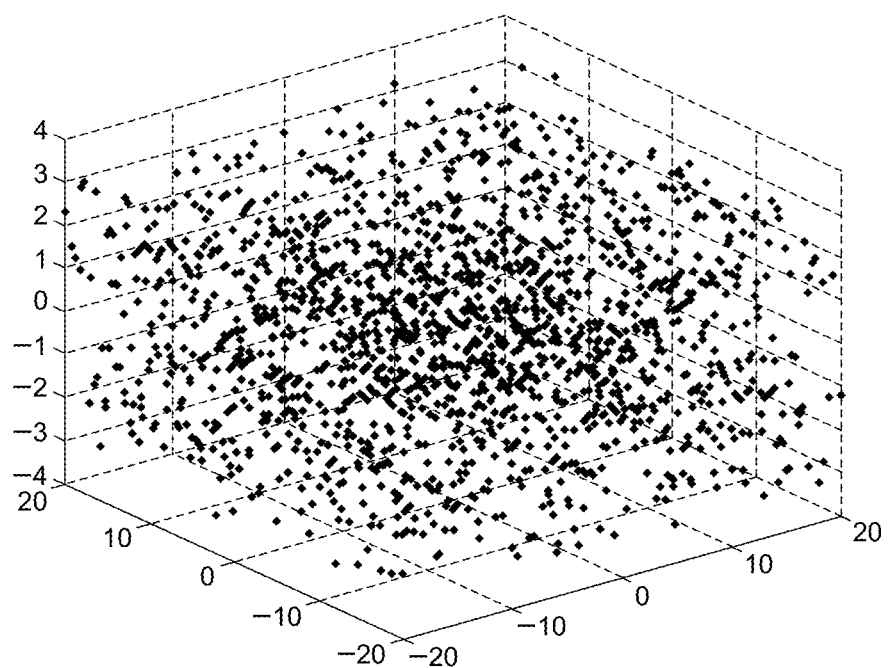
FIG. 15 is a view showing an example of a triaxial graph showing the distribution of three-dimensional points data of normalized cross power spectrum data in a case where the normalized cross power spectrum is not a complex sine wave having a single period for each dimension.

FIGS. 14 and 15 show examples of triaxial graphs each showing the distribution of the three-dimensional point cloud data of the normalized cross power spectrum data. The axes of the graph are $k_1$ axis, $k_2$ axis, and $\angle R$ ($k_1$, $k_2$) axis (frequency axis). One dot corresponds to the three-dimensional data ($k_1$, $k_2$, $\angle R$ ($k_1$, $k_2$)) of one element of the normalized cross power spectrum. In general, in a case where a normalized cross power spectrum is a complex sine wave having a single period for each dimension, plotting the phase angles of the respective elements on a triaxial graph shows that a certain plane is formed by most of the plots as shown in FIG. 14. This plane corresponds to an approximate plane. On the other hand, in a case where a normalized cross power spectrum is a complex sine wave that does not have a single period for each dimension, plotting the phase angles of the respective elements on a triaxial graph shows that the plots are randomly distributed as shown in FIG. 15. Therefore, even if an approximate plane is calculated, the least squares error for the approximate plane, that is, the least squares error when the approximate plane is calculated becomes large.

The determination part 125 acquires the value of the least squares error with respect to the approximate plane from the approximate plane calculation part 124, and uses the value of the least squares error as a score indicating a degree to which the normalized cross power spectrum is a complex sine wave having a single period for each dimension. Then, the determination part 125 collates the first image and the second image based on the value of the least squares error (score). For example, the determination part 125 determines that the first image and the second image are identical when the value of the least squares error (score) is less than a predetermined threshold value. On the other hand, the determination part 125 determines that the first image and the second image are not identical when the value of the least squares error (score) is equal to or more than the threshold value. In a case where there are a plurality of second images, the determination part 125 selects a second image having the best score and performs the above determination.

The image collating device 300 according to this example embodiment can collate the first image and the second image at high speeds for the same reason as the image collating device 100 according to the first example embodiment.

Third Example Embodiment

Next, an image collating device according to a third example embodiment of the present invention will be described. An image collating device 400 according to this example embodiment is the same as the image collating device 100 according to the first example embodiment, and is different in the complex sine wave determination part 105 from the image collating device 100.

Figure 16:
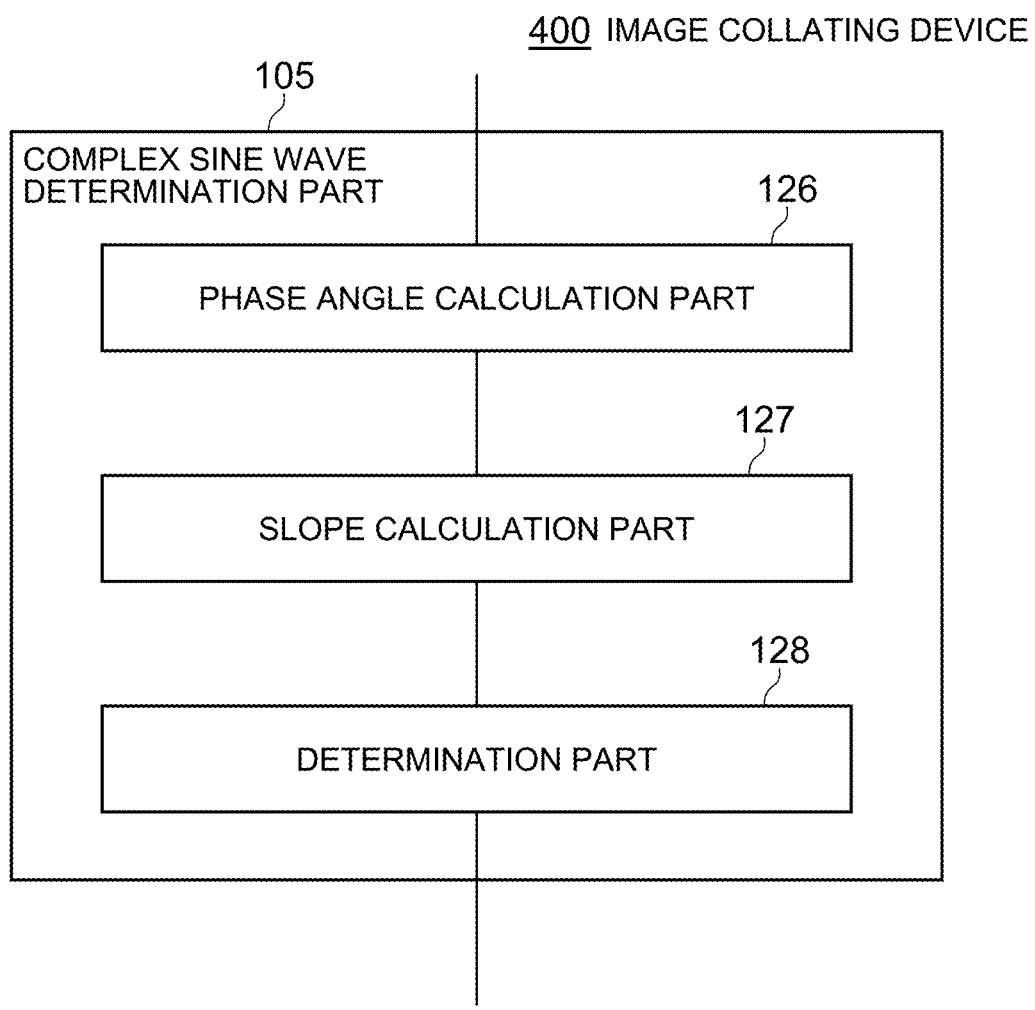
FIG. 16 is a block diagram showing an example of the complex sine wave determination part in an image collating device according to a third example embodiment of the present invention.

FIG. 16 is a block diagram of the complex sine wave determination part 105 in the image collating device 400 according to this example embodiment. The complex sine wave determination part 105 of this example includes a phase angle calculation part 126, a slope calculation part 127, and a determination part 128.

As with the phase angle calculation part 123 of FIG. 12, the phase angle calculation part 126 is configured to calculate a phase angle $\angle R\ (k_1, k_2)$ of each element of the normalized cross power spectrum obtained from the normalized cross power spectrum calculation part 104.

The slope calculation part 127 obtains the difference between the adjacencies with respect to the phase angle of each element obtained by the phase angle calculation part 126 for each element and for each dimension, and outputs the difference as phase angle slope data. For example, it is assumed that, as three-dimensional data corresponding to the elements of the normalized cross power spectrum, three-dimensional data of element 1 $(k_1, k_2, \angle R\ (k_1, k_2))$, three-dimensional data of element 2 $(k_1+1, k_2, \angle R\ (k_1 30\ 1, k_2))$, and three-dimensional data of element 3 $(k_1, k_2+1, \angle R\ (k_1, k_2+1))$ are present. At this time, a phase angle difference $\angle R\ (k_1+1, k_2) - \angle R\ (k_1, k_2)$ between element 1 and element 2 becomes one phase angle slope data of the dimension corresponding to the $k_1$ axis. A phase angle difference $\angle R\ (k_1, k_2+1) - \angle R\ (k_1, k_2)$ between element 1 and element 3 becomes one phase angle slope data of the dimension corresponding to the $k_2$ axis.

The determination part 128 calculates the dispersion of the phase angle slope data for each element and for each dimension, and uses the calculated dispersion as a score indicating a degree to which the normalized cross power spectrum is a complex sine wave having a single period for each dimension. As mentioned above, in a case where the normalized cross power spectrum is a complex sine wave having a single period for each dimension, plotting the phase angles on the frequency axis gives a planar shape. Therefore, phase angle slopes have constant values on the frequency axis at all times. On the other hand, in a case where the normalized cross power spectrum is not a complex sine wave having a single period for each dimension, the phase angles are randomly distributed. Therefore, phase angle slopes irregularly vary on the frequency axis. Therefore, the dispersion of the phase angle slope data for each dimension can be used as a score indicating a degree to which the normalized cross power spectrum is a complex sine wave having a single period for each dimension.

The determination part 128 collates the first image and the second image based on the calculated dispersion (score). For example, the determination part 128 determines that the first image and the second image are identical when the dispersion (score) is less than a predetermined threshold value. On the other hand, when the dispersion (score) is equal to or more than the threshold value, the determination part 128 determines that the first image and the second image are not identical. When there are a plurality of second images, the determination part 128 selects a second image having the best score and performs the above determination.

The image collating device 400 according to this example embodiment can collate the first image and the second image at high speeds for the same reason as the image collating device according to the first example embodiment.

Fourth Example Embodiment

Next, an image collating device according to a fourth example embodiment of the present invention will be described. An image collating device 500 according to this example embodiment is the same as the image collating devices according to the first to third example embodiments, and is different in the frequency characteristic acquisition part 101 from the image collating devices according to the first to third example embodiments.

Figure 17:
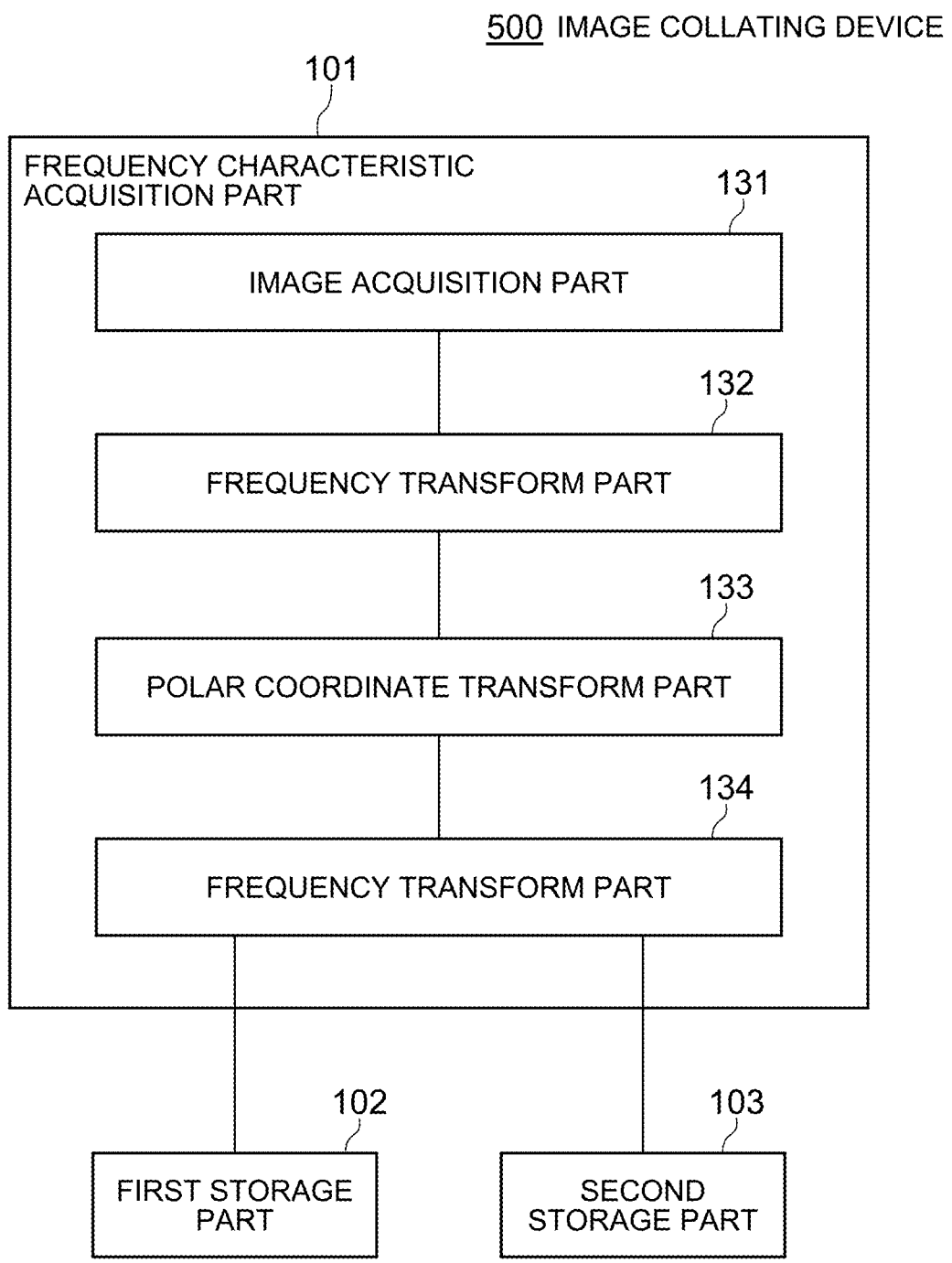
FIG. 17 is a block diagram showing an example of the frequency characteristic acquisition part in an image collating device according to a fourth example embodiment of the present invention.

FIG. 17 is a block diagram of the frequency characteristic acquisition part 101 in the image collating device 500 according to this example embodiment. The frequency characteristic acquisition part 101 of this example includes an image acquisition part 131, a frequency transform part 132, a polar coordinate transform part 133, and a frequency transform part 134.

The image acquisition part 131 is configured to acquire the first image and the second image as with the image acquisition part 111 of FIG. 4.

The frequency transform part 132 is configured to receive the first image and the second image from the image acquisition part 131, execute the discrete Fourier transform on each of the images, and calculate a two-dimensional amplitude spectrum from the result. The two-dimensional amplitude spectrum is invariant to the translation of the original image.

The polar coordinate transform part 133 is configured to receive the two-dimensional amplitude spectrum of the first image and the two-dimensional amplitude spectrum of the second image from the frequency transform part 132, execute polar coordinate transform or logarithmic polar coordinate transform on each of them, and obtain a polar coordinate image. The polar coordinate image is called a Fourier-Mellin feature image. Changes in magnification and rotation of the original image are transformed into changes in translation in the Fourier-Mellin feature image.

The frequency transform part 134 is configured to receive the Fourier-Mellin feature image of the first image and the Fourier-Mellin feature image of the second image from the polar coordinate transform part 133, and execute the discrete Fourier transform on each of them to obtain a phase image. The phase image is called a Fourier-Mellin frequency spectrum image. The Fourier-Mellin frequency spectrum image is invariant to the magnification, rotation, and translation of the original image. The frequency transform part 134 stores the Fourier-Mellin frequency spectrum image of the first image in the first storage part 102 and the Fourier-Mellin frequency spectrum image of the second image in the second storage part 103.

The image collating device 500 according to this example embodiment can collate the first image and the second image at high speeds for the same reason as the image collating devices according to the first to third example embodiments. Moreover, the image collating device 500 can perform collation robust to the magnification, rotation, and translation of the first and second images.

The polar coordinate transform part 133 of FIG. 17 may be omitted in an environment in which there is no misalignment in magnification and rotation between the first image and the second image. In the image collating device in which the polar coordinate transform part 133 is omitted, the frequency transform part 134 is configured to receive the two-dimensional amplitude spectrum of the first image and the two-dimensional amplitude spectrum of the second image from the frequency transform part 132, and store phase images as a result of executing the discrete Fourier transform on the two-dimensional amplitude spectrums into the first storage part 102 and the second storage part 103.

Fifth Example Embodiment

Next, an image collating device according to a fifth example embodiment of the present invention will be described. The image collating devices according to the first to fourth example embodiment described so far use, without discriminating, the inside of the region of the frequency characteristic of the first image and the inside of the region of the frequency characteristic of the second image, for collation. In contrast, the image collating device according to this example embodiment use, discriminating, the inside of the region of the frequency characteristic of the first image and the inside of the region of the frequency characteristic of the second image, for collation. To be specific, the image collating device divides the region of the frequency characteristic into a plurality of sub-regions, and sets the degree of effectiveness of a sub-region that adversely affects collation to be lower than those of the other sub-regions or avoids use of such a sub-region, thereby lowering an influence on collation.

Figure 18:
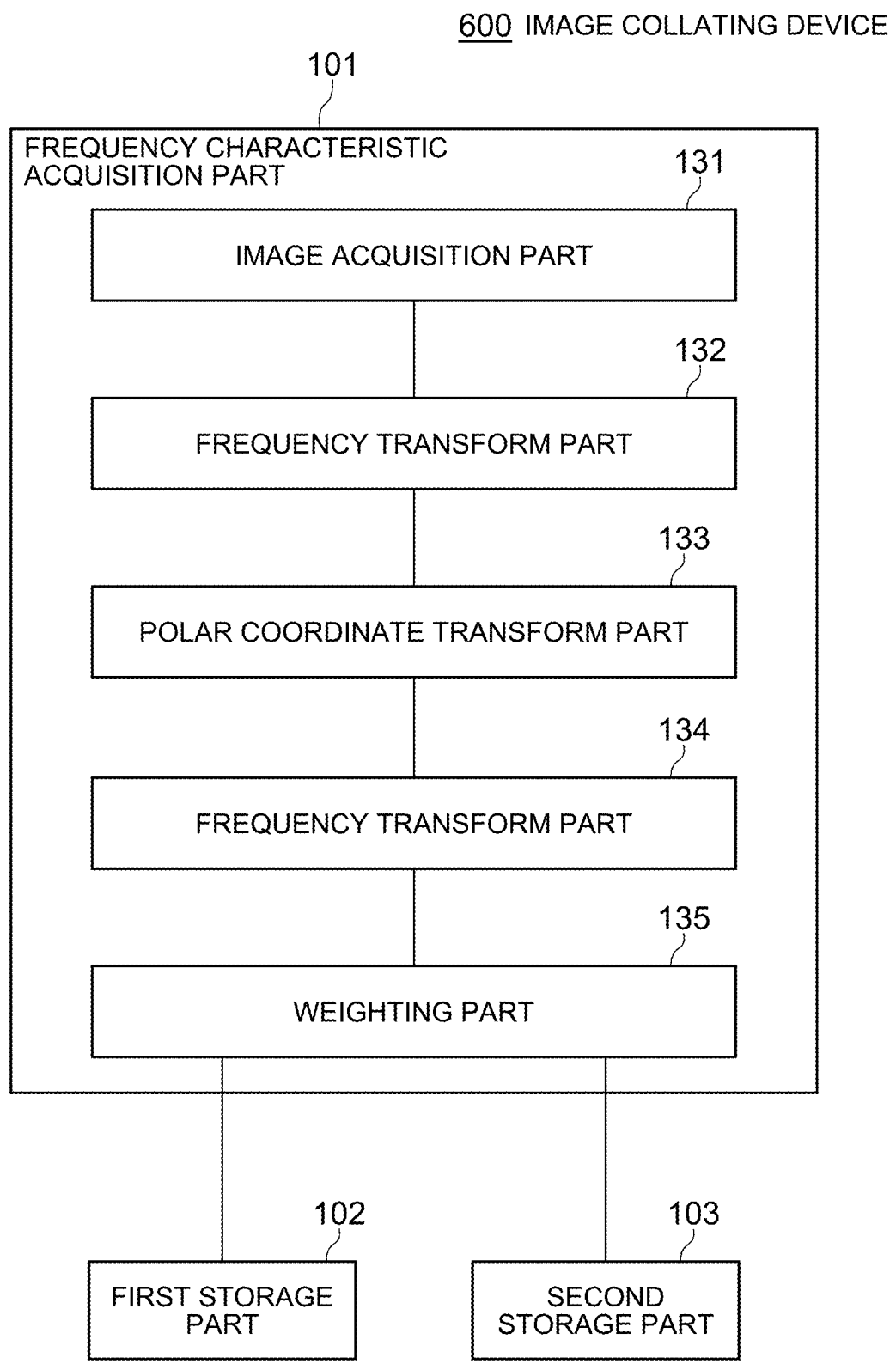
FIG. 18 is a block diagram showing an example of the frequency characteristic acquisition part in an image collating device according to a fifth example embodiment of the present invention.

FIG. 18 is a block diagram of the frequency characteristic acquisition part 101 in an image collating device 600 according to this example embodiment. The frequency characteristic acquisition part 101 of this example has a configuration in which the frequency characteristic acquisition part 101 shown in FIG. 17 includes a weighting part 135.

The weighting part 135 is configured to receive the first frequency characteristic and the second frequency characteristic from the frequency transform part 134 and give a weight to each of the sub-regions thereof. Herein, one element of the frequency characteristic may be one sub-region, or a set of adjacent elements may be one partial region. The value of the given weight may be, for example, a value from 0 to 1 and set so that the degree of effectiveness is lower as the value is to closer to 0.

A criterion for giving a weight to the sub-region is set beforehand. For example, a criterion may be used that, in a case where the presence of a frequency band that is important for collation is found by a statistical method, a larger weight is given to a sub-region corresponding to the frequency band that is important for collation than to the other sub-regions. Alternatively, a criterion may be used that, in a case where the presence of an image component that is common to a large number of images is found by a statistical method, a smaller weight is given to a sub-region including the common image component than to the other sub-regions. For example, in a case where an image component that is common to a plurality of registered images is present, when the same image component as described above is present in a compared image, the difference between a score indicating the degree of similarity between a compared image and a registered image that relate to an identical individual and a score indicating the degree of similarity between a compared image and a registered image that relate to different individuals becomes small due to an influence of the common image component. Use of the criterion that a smaller weight is given to a sub-region including a common image component than to the other sub-regions as described above can prevent the accuracy of individual identification from lowering.

As a method for thereafter processing the first and second frequency characteristics in which a weight is given to each of sub-regions, there are a plurality of method as illustrated below.

One possible method is a method in which a sub-region with a weight that is equal to or less than a reference value is eliminated by the frequency characteristic synthesizing part 104 and the normalized cross power spectrum of the first frequency characteristic and the second frequency characteristic including the remaining sub-regions is calculated.

In another one possible method, first, the frequency characteristic synthesizing part 104 calculates a normalized cross power spectrum in which to the product of the element of the first frequency characteristic and the element of the complex conjugate of the second frequency characteristic, a weight corresponding to weights given to the original elements (for example, a value obtained by multiplying both the weights) is given. Next, the complex sine wave determination part 105 considers weights given to the elements of the normalized cross power spectrum when calculating a score indicating the degree to which the normalized cross power spectrum is a wave having a single period. For example, when the dispersion of the absolute values of the slopes of the respective elements of the normalized cross power spectrum is calculated as the score, an influence on the dispersion of an element with a smaller weight is made to be smaller. Thus, the image collating device 600 according to this example embodiment can collate the first image and the second image at high speeds for the same reason as the image collating devices according to the first to fourth example embodiments. Moreover, even if sub-regions that adversely affects collation are included in the first image and the second image, it is possible to reduce an influence on collation.

Sixth Example Embodiment

Next, an image collating device according to a sixth example embodiment of the present invention will be described. An image collating device 700 according to this example embodiment is the same as the image collating device 100 according to the first example embodiment, and is different in the complex sine wave determination part 105 from the image collating device 100.

Figure 19:
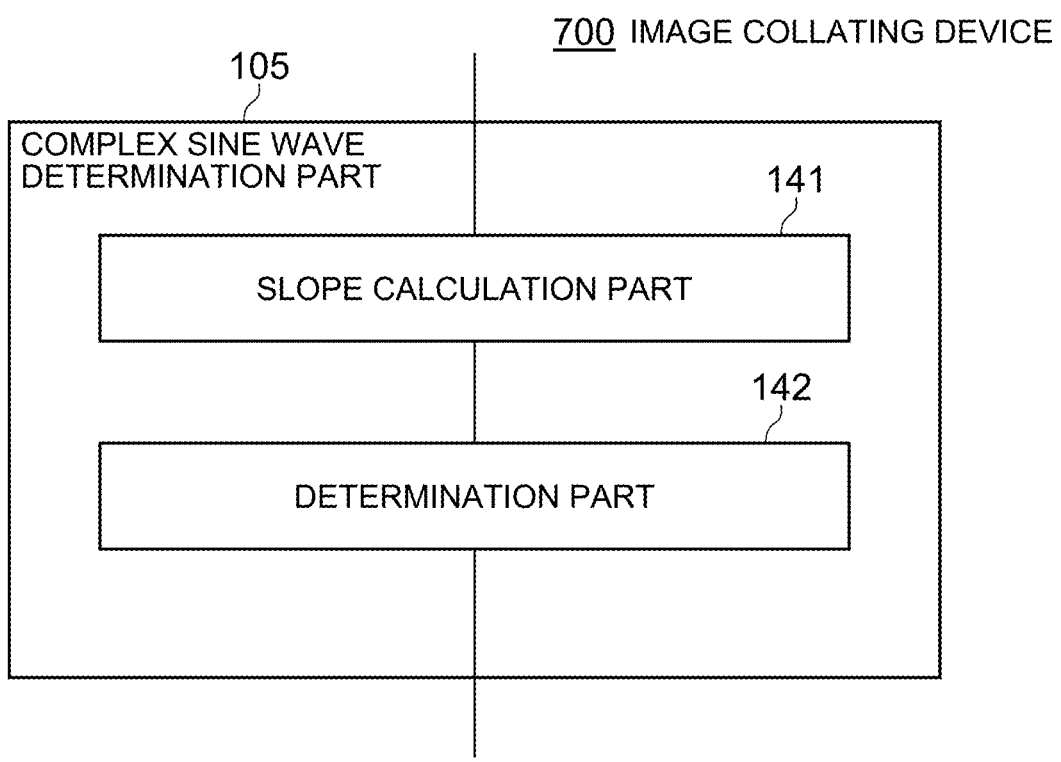
FIG. 19 is a block diagram showing an example of the complex sine wave determination part in an image collating device according to a sixth example embodiment of the present invention.

FIG. 19 is a block diagram showing an example of the complex sine wave determination part 105 in the image collating device 700 according to this example embodiment. The complex sine wave determination part 105 of this example includes a slope calculation part 141 and a determination part 142.

The slope calculation part 141 is configured to calculate a slope for each element of the normalized cross power spectrum obtained from the frequency characteristic synthesizing part 104. Mathematically speaking, the slope of each element of the normalized cross power spectrum is expressed by a two-dimensional vector in which a result of partially differentiating the normalized cross power spectrum with one of the discrete frequency indexes $k_1$ and $k_2$ and a result of partially differentiating the normalized cross power spectrum with the other discrete index are aligned. Actually, the slope calculation part 141 calculates the slope for each element of the normalized cross power spectrum in the following manner. First, the slope calculation part 141 calculates, for each element of the normalized cross power spectrum, the difference between the normalized cross power spectrum values of the element and an element adjacent thereto in one of the discrete frequency index directions. Then, the slope calculation part 141 holds the calculated difference value as a first partial differential value of the element. Next, the slope calculation part 141 calculates, for each element of the normalized cross power spectrum, the difference between the normalized cross power spectrum values of the element and an element adjacent thereto in the other discrete frequency index direction. Then, the slope calculation part 141 holds the calculated difference value as a second partial differential value of the element. Then, the slope calculation part 141 outputs a two-dimensional vector in which the first partial differential value and the second partial differential value are aligned for each element of the normalized cross power spectrum as the slope of the element. Alternatively, more preferably, the slope calculation part 141 applies, for each element of the normalized cross power spectrum, for example, a 3×3 Prewitt filter 901 as shown in FIG. 24 to the real part and the imaginary part, respectively, and obtains the first partial differential value. Moreover, the slope calculation part 141 applies, for each element of the normalized cross power spectrum, for example, a 3×3 Prewitt filter 902 as shown in FIG. 24 to the real part and the imaginary part, respectively, and obtains the second partial differential value. Then, the slope calculation part 141 outputs, for each element of the normalized cross power spectrum, a two-dimensional vector in which the first partial differential value and the second partial differential value are aligned, as the slope of the element. A 3×'Sobel filter or the like may be used instead of the 3×'Prewitt filter. The amount of operation for calculating the slope of each element of the normalized cross power spectrum is much less than the amount of operation for executing the inverse Fourier transform on the normalized cross power spectrum. A specific example will be described below using mathematical expressions.

As described above, when two frequency characteristics to be collated are identical images (identical patterns) with misalignment on image data before frequency transform, the normalized cross power spectrum R $(k_1, k_2)$ of the first frequency characteristic F $(k_1, k_2)$ and the second frequency characteristic G $(k_1, k_2)$ is given by Equation 9 shown in FIG. 8. Equation 15 of FIG. 20 shows an example of calculation of the slope of the normalized cross power spectrum of identical image data, which is calculated by partially differentiating the right side of Equation 9 with $k_1$ and $k_2$. The absolute value thereof is a constant value regardless of $k_1$ and $k_2$ (discrete frequency indexes) as shown in Equation 16 of FIG. 20. Thus, since the absolute value of the slope is a constant value regardless of $k_1$ and $k_2$, the dispersion is ideally zero.

On the other hand, when two frequency characteristics to be collated are mutually different images (different patterns), the normalized cross power spectrum R $(k_1, k_2)$ of the first frequency characteristic F $(k_1, k_2)$ and the second frequency characteristic G $(k_1, k_2)$ is given by Equation 6 shown in FIG. 7. Equation 17 in FIG. 21 is an example of calculation of the slope of the normalized cross power spectrum of mutually different images, which is calculated by differentiating the right side of Equation 6 with $k_1$ and $k_2$. The absolute value thereof varies in accordance with $k_1$ and $k_2$ (discrete frequency indexes) as shown in Equation 18 of FIG. 21. Thus, the absolute value of the second-order partial differential value varies in accordance with $k_1$ and $k_2$, so that the dispersion value is equal to or more than a predetermined threshold value.

The determination part 142 takes the absolute values of the slopes of the respective elements of the normalized cross power spectrum calculated by the slope calculation part 141, and calculates the dispersion of the absolute values. In a case where the normalized cross power spectrum is a complex sine wave having a single period for each dimension, the absolute values of the slopes of the respective elements are constant on the frequency axis as described above. On the other hand, in a case where the normalized cross power spectrum is not a complex sine wave having a single period for each dimension, the absolute values of the slopes of the respective elements irregularly vary on the frequency axis as described above. Therefore, the dispersion of the absolute values of the slopes of the respective elements of the normalized cross power spectrum can be used as a score indicating a degree to which the normalized cross power spectrum is a complex sine wave having a single period for each dimension. Then, the determination part 142 collates the first image and the second image based on the calculated dispersion (score). For example, the determination part 142 determines that the first image and the second image are identical when the dispersion (score) is smaller than a predetermined threshold value. On the other hand, when the dispersion (score) is equal to or more than the threshold value, the determination part 142 determines that the first image and the second image are not identical. In a case where a plurality of second images are present, the determination part 142 selects a second image having the best score and performs the above determination.

The complex sine wave determination part 105 shown in FIG. 19 does not calculate a phase angle. Therefore, as compared with the complex sine wave determination parts of the other example embodiments that obtain phase angles described above, the amount of operation required for collation is smaller, and the result of collation can be derived at high speeds.

Thus, the image collating device 700 according to this example embodiment can collate the first image and the second image at high speeds for the same reason as the image collating device 100 according to the first example embodiment.

Seventh Example Embodiment

Figure 22:
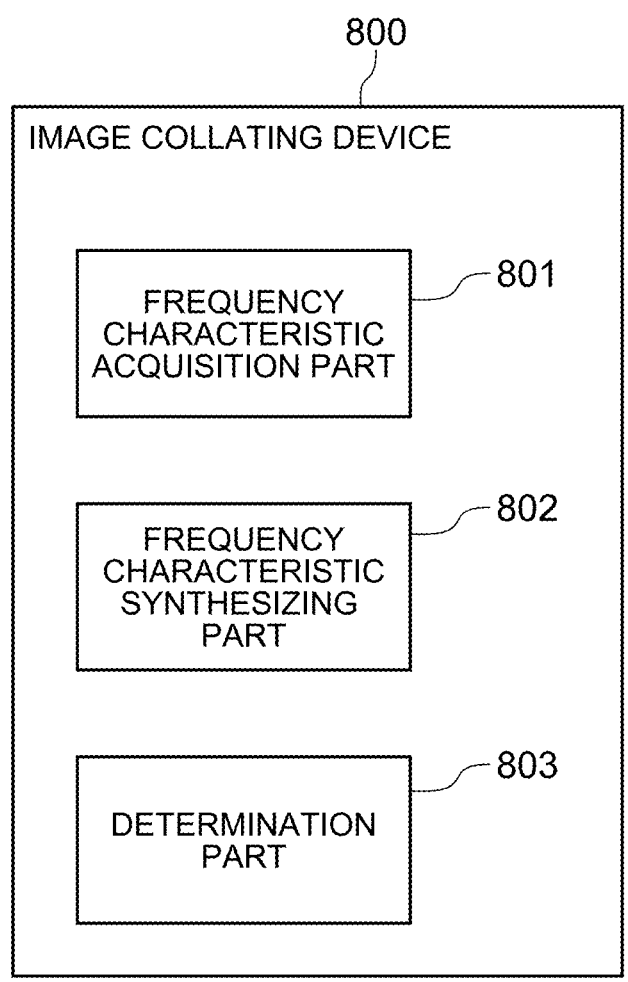
FIG. 22 is a block diagram of an image collating device according to a seventh example embodiment of the present invention.

Next, an image collating device according to a seventh example embodiment of the present invention will be described. FIG. 22 is a block diagram of an image collating device 800 according to this example embodiment.

Referring to FIG. 22, the image collating device 800 includes a frequency characteristic acquisition part 801, a frequency characteristic synthesizing part 802, and a determination part 803.

The frequency characteristic acquisition part 801 is configured to acquire the frequency characteristic of the first image and the frequency characteristic of the second image. For example, the frequency characteristic acquisition part 801 can be configured to have the same configuration as the frequency characteristic acquisition part 101 of FIG. 1, but is not limited thereto.

The frequency characteristic synthesizing part 802 is configured to synthesize the frequency characteristic of the first image and the frequency characteristic of the second image to acquire a synthesized frequency characteristic. For example, the frequency characteristic synthesizing part 802 can be configured to have the same configuration as the frequency characteristic synthesizing part 104 of FIG. 1, but is not limited thereto.

The determination part 803 is configured to calculate a score indicating a degree to which the synthesized frequency characteristic is a wave having a single period and collate the first image and the second image based on the score. The determination part 803 can be configured to have the same configuration as the complex sine wave determination part 105 of FIG. 1, but is not limited thereto.

The image collating device 800 according to this example embodiment thus configured operates in the following manner. First, the frequency characteristic acquisition part 801 acquires the frequency characteristic of the first image and the frequency characteristic of the second image. Next, the frequency characteristic synthesizing part 802 synthesizes the frequency characteristic of the first image and the frequency characteristic of the second image to acquire a synthesized frequency characteristic. Next, the determination part 803 calculates a score indicating a degree to which the synthesized frequency characteristic is a wave having a single period. Next, the determination part 803 collate the first image and the second image based on the score.

Thus, the image collating device 800 according to this example embodiment can determine collation of between the first image and the second image at high speeds. The reason is that the image collating device 800 according to this example embodiment does not need to execute the inverse Fourier transform requiring a large amount of operation because it executes frequency transform on the first image and second image to acquire the frequency characteristic of the first image and the frequency characteristic of the second image, calculates a synthesized frequency characteristic obtained by synthesizing the two frequency characteristics, calculates a score indicating a degree to which the synthesized frequency characteristic is a wave having a single period, and collates the first image and the second image based on the score.

Although the present invention has been described above referring to the example embodiments, the present invention is not limited to the example embodiments. The configuration and details of the present invention can be changed in various manners that can be understood by one skilled in the art within the scope of the present invention.

For example, the normalized cross power spectrum may be calculated by the following method. First, the frequency characteristic acquisition part 101 executes frequency transform such as the Fourier transform on the first image and the second image, normalizes the respective results using the amplitude components, and calculates the normalized first frequency characteristic F ($k_1$, $k_2$) and the normalized second frequency characteristic G ($k_1$, $k_2$). On the other hand, the frequency characteristic synthesizing part 104 calculates the normalized cross power spectrum by synthesizing the normalized frequency characteristics. To be specific, the frequency characteristic synthesizing part 104 calculates the normalized cross power spectrum by obtaining a cross power spectrum that is the product of the normalized first frequency characteristic F ($k_1$, $k_2$) and the complex conjugate of the normalized second frequency characteristic G ($k_1$, $k_2$) for each element. In this case, the frequency characteristic synthesizing part 104 does not perform the process of normalizing with an absolute value, unlike in the method shown in Equation 6 of FIG. 7. According to the method of calculating the normalized cross power spectrum in the above manner, in a case where there are a plurality of second images, it is possible, by holding the respective normalized frequency characteristics in the second storage part beforehand, to perform the collation at high speeds. The reason is that at the time of the collation, simply by synthesizing the normalized frequency characteristic of the first image and the normalized frequency characteristic of the second image, it is possible to calculate the normalized cross power spectrum, and it is possible to omit the process of normalizing with an absolute value.

The present invention is based upon and claims the benefit of priority from Japanese patent application No. 2017-245795, filed on Dec. 22, 2017, the disclosure of which is incorporated herein in its entirety by reference.

The present invention can be used in the field of collating two images, and in particular, it can be used in the field of performing individual identification and management of individual products by acquiring the difference in naturally occurring fine patterns that occur in the same manufacturing process, such as fine irregularities and patterns on the surfaces of products and random patterns on the material surfaces, as an image using an imaging device such as a camera, and recognizing the fine patterns.

<Supplementary Notes>

The whole or part of the example embodiments disclosed above can be described as, but not limited to, the following supplementary notes.

(Supplementary Note 1)

An image collating device that collates a first image and a second image, the image collating device comprising:

a frequency characteristic acquiring unit configured to acquire a frequency characteristic of the first image and a frequency characteristic of the second image;

a frequency characteristic synthesizing unit configured to generate a synthesized frequency characteristic by synthesizing the frequency characteristic of the first image and the frequency characteristic of the second image; and a determining unit configured to calculate a score indicating a degree to which the synthesized frequency characteristic is a wave having a single period, and collate the first image and the second image based on the score.

(Supplementary Note 2)

The image collating device according to Supplementary Note 1, wherein the frequency characteristic synthesizing unit calculates a normalized cross power spectrum of the frequency characteristic of the first image and the frequency characteristic of the second image, as the synthesized frequency characteristic.

(Supplementary Note 3)

The image collating device according to Supplementary Note 1 or 2, wherein the determining unit calculates a score indicating a degree to which the synthesized frequency characteristic is a complex sine wave having a single period, as the score.

(Supplementary Note 4)

The image collating device according to any of Supplementary Notes 1 to 3, wherein the determining unit calculates dispersion of absolute values of slopes of respective elements of the synthesized frequency characteristic, as the score.

(Supplementary Note 4-1)

The image collating device according to any of Supplementary Notes 1 to 3, wherein the determining unit calculates dispersion of absolute values of second-order partial differential values of respective elements of the synthesized frequency characteristic, as the score.

(Supplementary Note 5)

The image collating device according to any of Supplementary Notes 1 to 3, wherein the determining unit obtains phase angles of respective elements of the synthesized frequency characteristic and calculates a degree to which the phase angles are linear with respect to frequency, as the score.

(Supplementary Note 6)

The image collating device according to Supplementary Note 5, wherein the determining unit obtains an approximate plane that fits the phase angles of the respective elements of the synthesized frequency characteristic and calculates a least squares error of the phase angles of the respective elements with respect to the approximate plane, as the score.

(Supplementary Note 7)

The image collating device according to Supplementary Note 5, wherein the determining unit obtains slopes each of which is a difference in phase angle between the elements of the synthesized frequency characteristic, and calculates dispersion of the slopes as the score.

(Supplementary Note 8)

The image collating device according to any of Supplementary Notes 1 to 7, wherein the frequency characteristic acquiring unit includes:

an image acquiring unit configured to acquire the first image and the second image; and a frequency transform unit configured to execute frequency transform on the first image and the second image to calculate the frequency characteristic of the first image and the frequency characteristic of the second image.

(Supplementary Note 9)

The image collating device according to any of Supplementary Notes 1 to 7, wherein the frequency characteristic acquiring unit includes:

an image acquiring unit configured to acquire the first image and the second image;

a first frequency transform unit configured to execute frequency transform on the first image and the second image to calculate an amplitude spectrum of the first image and an amplitude spectrum of the second image;

a polar coordinate transform unit configured to execute polar coordinate transform on the amplitude spectrum of the first image and the amplitude spectrum of the second image to calculate a Fourier-Mellin characteristic image of the first image and a Fourier-Mellin characteristic image of the second image; and a second frequency transform unit configured to execute frequency transform on the Fourier-Mellin characteristic image of the first image and the Fourier-Mellin characteristic image of the second image to calculate a Fourier-Mellin frequency spectrum image of the first image and a Fourier-Mellin frequency spectrum image of the second image.

(Supplementary Note 10)

The image collating device according to any of Supplementary Notes 1 to 9, wherein the frequency characteristic acquiring unit divides the frequency characteristic of the first image and the frequency characteristic of the second image into a plurality of sub-regions, and gives a degree of effectiveness relating to calculation of the score to each of the sub-regions.

(Supplementary Note 11)

The image collating device according to any of Supplementary Notes 1 to 10, wherein the first image is a compared image obtained by imaging a comparison target object and the second image is one of registered images obtained by imaging a plurality of registration target objects.

(Supplementary Note 12)

The image collating device according to any of Supplementary Notes 1 to 11, wherein the determining unit generates a collation result that the first image matches the second image in a case where the score satisfies a predetermined reference value.

(Supplementary Note 13)

The image collating device according to any of Supplementary Notes 1 to 12, further comprising an outputting unit configured to output a result of collation by the determining unit.

(Supplementary Note 14)

An image collating method for collating a first image and a second image, the image collating method comprising:

acquiring a frequency characteristic of the first image and a frequency characteristic of the second image;

generating a synthesized frequency characteristic by synthesizing the frequency characteristic of the first image and the frequency characteristic of the second image;

calculating a score indicating a degree to which the synthesized frequency characteristic is a wave having a single period; and collating the first image and the second image based on the score.

(Supplementary Note 15)

The image collating method according to Supplementary Note 14, wherein in the generating the synthesized frequency characteristic, a normalized cross power spectrum of the frequency characteristic of the first image and the frequency characteristic of the second image is calculated as the synthesized frequency characteristic.

(Supplementary Note 16)

The image collating method according to Supplementary Note 14 or 15, wherein in the calculating the score, a score indicating a degree to which the synthesized frequency characteristic is a complex sine wave having a single period is calculated.

(Supplementary Note 17)

The image collating method according to any of Supplementary Notes 14 to 16, wherein in the calculating the score, dispersion of absolute values of slopes of respective elements of the synthesized frequency characteristic is calculated as the score.

(Supplementary Note 17-1)

The image collating method according to any of Supplementary Notes 14 to 16, wherein in the calculating the score, dispersion of absolute values of second-order partial differential values of respective elements of the synthesized frequency characteristic is calculated as the score.

(Supplementary Note 18)

The image collating method according to any of Supplementary Notes 14 to 16, wherein in the calculating the score, phase angles of respective elements of the synthesized frequency characteristic are obtained, and a degree to which the phase angles are linear with respect to frequency is calculated as the score.

(Supplementary Note 19)

The image collating method according to Supplementary Note 18, wherein in the calculating the score, an approximate plane that fits the phase angles of the respective elements of the synthesized frequency characteristic is obtained, and a least squares error of the phase angles of the respective elements with respect to the approximate plane is calculated as the score.

(Supplementary Note 20)

The image collating method according to Supplementary Note 18, wherein in the calculating the score, slopes each of which is a difference in phase angle between the elements of the synthesized frequency characteristic is obtained, and dispersion of the slopes is calculated as the score.

(Supplementary Note 21)

The image collating method according to any of Supplementary Notes 14 to 20, wherein in the acquiring the frequency characteristic of the first image and the frequency characteristic of the second image:

the first image and the second image are acquired; and frequency transform is executed on the first image and the second image to calculate the frequency characteristic of the first image and the frequency characteristic of the second image.

(Supplementary Note 22)

The image collating method according to any of Supplementary Notes 14 to 20, wherein in the acquiring the frequency characteristic of the first image and the frequency characteristic of the second image:

the first image and the second image are acquired;

frequency transform is executed on the first image and the second image to calculate an amplitude spectrum of the first image and an amplitude spectrum of the second image;

polar coordinate transform is executed on the amplitude spectrum of the first image and the amplitude spectrum of the second image to calculate a Fourier-Mellin characteristic image of the first image and a Fourier-Mellin characteristic image of the second image; and frequency transform is executed on the Fourier-Mellin characteristic image of the first image and the Fourier-Mellin characteristic image of the second image to calculate a Fourier-Mellin frequency spectrum image of the first image and a Fourier-Mellin frequency spectrum image of the second image.

(Supplementary Note 23)

The image collating method according to any of Supplementary Notes 14 to 22, wherein in the acquiring the frequency characteristic of the first image and the frequency characteristic of the second image:

the frequency characteristic of the first image and the frequency characteristic of the second image are divided into a plurality of sub-regions, and a degree of effectiveness relating to calculation of the score is given to each of the sub-regions.

(Supplementary Note 24)

The image collating method according to any of Supplementary Notes 14 to 23, wherein the first image is a compared image obtained by imaging a comparison target object and the second image is one of registered images obtained by imaging a plurality of registration target objects.

(Supplementary Note 25)

The image collating method according to any of Supplementary Notes 14 to 24, wherein a collation result that the first image matches the second image is generated in a case where the score satisfies a predetermined reference value.

(Supplementary Note 26)

The image collating method according to any of Supplementary Notes 14 to 25, wherein in the collating, a result of the collating is output.

(Supplementary Note 27)

A program comprising instructions for causing a computer collating a first image and a second image to function as:

a frequency characteristic acquisition part configured to acquire a frequency characteristic of the first image and a frequency characteristic of the second image;

a frequency characteristic synthesizing part configured to generate a synthesized frequency characteristic by synthesizing the frequency characteristic of the first image and the frequency characteristic of the second image; and a determination part configured to calculate a score indicating a degree to which the synthesized frequency characteristic is a wave having a single period, and collate the first image and the second image based on the score.

(Supplementary Note 28)

The image collating device, the image collating method, or the program according to any of Supplementary Notes 1 to 27, wherein by normalizing the synthesized frequency characteristic with an absolute value thereof, a synthesized frequency characteristic is calculated.

(Supplementary Note 29)

The image collating device, the image collating method, or the program according to any of Supplementary Notes 1 to 28, wherein a first frequency characteristic and a second frequency characteristic are calculated, the first frequency characteristic being obtained by normalizing the frequency characteristic of the first image with an amplitude component thereof, the second frequency characteristic being obtained by normalizing the frequency characteristic of the second image with an amplitude component thereof.

(Supplementary Note 30)

The image collating device, the image collating method, or the program according to any of Supplementary Notes 1 to 29, wherein by synthesizing the normalized first frequency characteristic and the normalized second frequency characteristic and normalizing, a synthesized frequency characteristic or a normalized cross power spectrum is calculated.

DESCRIPTION OF NUMERALS

100 image collating device
101 frequency characteristic acquisition part 102 first storage part
103 second storage part
104 frequency characteristic synthesizing part
105 complex sine wave determination part
106 information presenting part
111 image acquisition part
112 frequency transform part
121 second-order partial differential calculation part
122 determination part
123 phase angle calculation part
124 approximate plane calculation part
125 determination part
126 phase angle calculation part
127 slope calculation part
128 determination part
131 image acquisition part
132 frequency transform part
133 polar coordinate transform part
134 frequency transform part
135 weighting part
141 slope calculation part
142 determination part
200 information processing device
201 imaging part
202 operation input part
203 screen display part
204 communication interface part
205 storage part
206 arithmetic processing part
207 program
300 image collating device
400 image collating device
500 image collating device
600 image collating device
700 image collating device
800 image collating device
801 frequency characteristic acquisition part
802 frequency characteristic synthesizing part
803 determination part

The invention claimed is:

1. An image collating device comprising:
a memory containing program instructions; and
a processor coupled to the memory, wherein the processor is configured to execute the program instructions to:
perform acquisition of a frequency characteristic of a first image and a frequency characteristic of a second image;
perform generation of a synthesized frequency characteristic by synthesizing the frequency characteristic of the first image and the frequency characteristic of the second image; and
calculate a score indicating a degree to which the synthesized frequency characteristic is a wave having a single period, and perform collation of the first image and the second image based on the score.

2. The image collating device according to claim 1, wherein in the generation of the synthesized frequency characteristic, a normalized cross power spectrum of the frequency characteristic of the first image and the frequency characteristic of the second image is calculated as the synthesized frequency characteristic.

3. The image collating device according to claim 1, wherein in the collation, a score indicating a degree to which the synthesized frequency characteristic is a complex sine wave having a single period is calculated as the score.

4. The image collating device according to claim 1, wherein in the collation, dispersion of absolute values of slopes of respective elements of the synthesized frequency characteristic is calculated as the score.

5. The image collating device according to claim 1, wherein in the collation, dispersion of absolute values of second-order partial differential values of respective elements of the synthesized frequency characteristic is calculated as the score.

6. The image collating device according to claim 1, wherein in the collation, phase angles of respective elements of the synthesized frequency characteristic are obtained and a degree to which the phase angles are linear with respect to frequency is calculated as the score.

7. The image collating device according to claim 6, wherein in the collation, an approximate plane that fits the phase angles of the respective elements of the synthesized frequency characteristic is obtained and a least squares error of the phase angles of the respective elements with respect to the approximate plane is calculated as the score.

8. The image collating device according to claim 6, wherein in the collation, slopes each of which is a difference in phase angle between the elements of the synthesized frequency characteristic are obtained, and dispersion of the slopes is calculated as the score.

9. The image collating device according to claim 1, wherein in the acquisition:
the first image and the second image are acquired; and
frequency transform is executed on the first image and the second image to calculate the frequency characteristic of the first image and the frequency characteristic of the second image.

10. The image collating device according to claim 1, wherein in the acquisition:
the first image and the second image are acquired;
frequency transform is executed on the first image and the second image to calculate an amplitude spectrum of the first image and an amplitude spectrum of the second image;
polar coordinate transform is executed on the amplitude spectrum of the first image and the amplitude spectrum of the second image to calculate a Fourier-Mellin characteristic image of the first image and a Fourier-Mellin characteristic image of the second image; and
frequency transform is executed on the Fourier-Mellin characteristic image of the first image and the Fourier-Mellin characteristic image of the second image to calculate a Fourier-Mellin frequency spectrum image of the first image and a Fourier-Mellin frequency spectrum image of the second image.

11. The image collating device according to claim 1, wherein in the acquisition, the frequency characteristic of the first image and the frequency characteristic of the second image are divided into a plurality of sub-regions, and a degree of effectiveness relating to calculation of the score is given to each of the sub-regions.

12. The image collating device according to claim 1, wherein the first image is a compared image obtained by imaging a comparison target object and the second image is one of registered images obtained by imaging a plurality of registration target objects.

13. The image collating device according to claim 1, wherein in the collation, a collation result that the first image matches the second image is generated in a case where the score satisfies a predetermined reference value.

14. The image collating device according to claim 1, wherein the processor is further configured to output a result of the collation.

15. An image collating method comprising:
acquiring a frequency characteristic of a first image and a frequency characteristic of a second image;
generating a synthesized frequency characteristic by synthesizing the frequency characteristic of the first image and the frequency characteristic of the second image;
calculating a score indicating a degree to which the synthesized frequency characteristic is a wave having a single period; and
collating the first image and the second image based on the score.

16. The image collating method according to claim 15, wherein in the generating the synthesized frequency characteristic, a normalized cross power spectrum of the frequency characteristic of the first image and the frequency characteristic of the second image is calculated as the synthesized frequency characteristic.

17. The image collating method according to claim 15, wherein in the calculating the score, a score indicating a degree to which the synthesized frequency characteristic is a complex sine wave having a single period is calculated.

18. The image collating method according to claim 15, wherein in the calculating the score, dispersion of absolute values of slopes of respective elements of the synthesized frequency characteristic is calculated as the score.

19. The image collating method according to claim 15, wherein in the calculating the score, dispersion of absolute values of second-order partial differential values of respective elements of the synthesized frequency characteristic is calculated as the score.

20. A non-transitory computer-readable medium having stored thereon a program for causing a computer to:
acquire a frequency characteristic of the first image and a frequency characteristic of the second image;
generate a synthesized frequency characteristic by synthesizing the frequency characteristic of the first image and the frequency characteristic of the second image; and
calculate a score indicating a degree to which the synthesized frequency characteristic is a wave having a single period, and collate the first image and the second image based on the score.

\* \* \* \* \*